United States Patent [19]
Siljestroemer

[11] Patent Number: 5,682,533
[45] Date of Patent: Oct. 28, 1997

[54] UPDATING SOFTWARE WITHIN A TELECOMMUNICATIONS SWITCH WITHOUT INTERRUPTING EXISTING COMMUNICATION AND NEITHER MOVING NOR CONVERTING DATA

[75] Inventor: Thomas Siljestroemer, Hanirge, Sweden

[73] Assignee: Telefonaktiebolaget LM Ericsson (Publ), Stockholm, Sweden

[21] Appl. No.: 313,474

[22] Filed: Sep. 27, 1994

[51] Int. Cl.[6] .................................................. G06F 17/30
[52] U.S. Cl. .................. 395/616; 396/619; 396/653; 396/712; 379/58; 379/59; 379/242
[58] Field of Search .................................. 395/600, 700, 395/650, 800, 616, 619, 653, 712; 379/58, 59, 242

[56] References Cited

U.S. PATENT DOCUMENTS

| | | | |
|---|---|---|---|
| 4,954,941 | 9/1990 | Redman | 395/650 |
| 5,008,814 | 4/1991 | Mathur | 364/200 |
| 5,134,701 | 7/1992 | Mueller et al. | 395/500 |
| 5,155,819 | 10/1992 | Watkins et al. | 395/375 |
| 5,155,837 | 10/1992 | Liu et al. | 395/500 |
| 5,175,828 | 12/1992 | Hall et al. | 395/375 |
| 5,179,703 | 1/1993 | Evans | 395/700 |
| 5,241,645 | 8/1993 | Cimral et al. | 395/500 |
| 5,269,017 | 12/1993 | Hayden et al. | 395/575 |
| 5,274,831 | 12/1993 | Katsuta | 395/800 |
| 5,276,888 | 1/1994 | Kardach et al. | 395/725 |
| 5,276,903 | 1/1994 | Shinagawa | 395/800 |
| 5,283,868 | 2/1994 | Baker et al. | 395/200 |
| 5,287,467 | 2/1994 | Blaner et al. | 395/375 |
| 5,303,376 | 4/1994 | Taki | 395/700 |
| 5,339,430 | 8/1994 | Lundin et al. | 395/700 |
| 5,359,730 | 10/1994 | Marron | 395/650 |
| 5,361,298 | 11/1994 | Ruel et al. | 379/242 |
| 5,410,703 | 4/1995 | Nilsson et al. | 395/700 |
| 5,421,017 | 5/1995 | Scholz et al. | 395/700 |
| 5,495,612 | 2/1996 | Hirayama et al. | 395/700 |
| 5,548,640 | 8/1996 | Blondel et al. | 379/242 |

FOREIGN PATENT DOCUMENTS

| | | |
|---|---|---|
| 2 264 575 | 2/1993 | United Kingdom . |
| WO 94/01819 | 1/1994 | WIPO . |

OTHER PUBLICATIONS

Hidetake Ishimoto, Katsuyuki Fujita, *NTT Communication Switching Laboratories, Dynamic Program Updating In Packet Switching Systems*, 29 Nov. 1993, pp. 703–707.

Primary Examiner—Thomas G. Black
Assistant Examiner—Paul R. Lintz
Attorney, Agent, or Firm—Jenkens & Gilchrist P.C.

[57] ABSTRACT

A system and method for exchanging an old software version for a new version within a telecommunications switch without a system restart. The switch includes memory, a software loading subsystem, a database management subsystem, and a program exchange subsystem. The new software version is exchanged for the old software version by loading the new software version into the memory of the switch using the software loading subsystem. The new software version is then registered in the program exchange subsystem using the database management subsystem. The old software version is passivated, and the new software version is activated using the program exchange subsystem, thereby, exchanging the old software version for the new software version.

12 Claims, 14 Drawing Sheets

BSA = Base Start Address
DS = Data Store
MUP = Multiple Position
PS = Program Store
PSA = Program Start Address
RS = Reference Store
SDT = Signal Distribution Table
WA = Word Address

UPDATING SOFTWARE WITHIN A TELECOMMUNICATIONS SWITCH WITHOUT INTERRUPTING EXISTING COMMUNICATION AND NEITHER MOVING NOR CONVERTING DATA

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

1. Technical Field of the Invention

The present invention generally relates to updating software within a telecommunications switch. More particularly, the present invention relates to a method and system for updating an old software version by exchanging the old software with a new software version without a restart of the telecommunications switch.

2. Description of Related Art

In the modern telecommunication industry, computer software (software) is often used to control the various aspects of processing calls within a telecommunications switch. Unfortunately, telecommunications software, and other types of software, often contain errors or undesired responses. The errors or undesired responses are usually corrected by a new version of the software which is intended to replace the defective version.

In certain types of computing systems, such as stand-alone or batch processing systems, exchanging old software with a newer version presents few obstacles. Typically, the computer system is merely shut down during a period of the day when there is little activity and maintenance personnel are readily available. The old software is then simply removed and replaced by the newer version. Thereafter, the computing system is restarted and all future data processing is done with the new version of the software.

In other types of computing systems, such as modern stored program control (SPC) telecommunications exchange systems (commonly referred to in the industry simply as "switches"), the exchanging of software in the system is not as simple as in the standalone batch processing systems.

Telecommunication switches are designed and intended to run perpetually without interruption in order to serve the continuous need for communication services within a community. In other words, a continuous flow of telecommunications traffic is being processed by the switch even during off hours of the day or night. Any interruption in the operation of the switch would consequently result in a disruption of the telecommunications traffic within the switch. Such a disruption is highly undesirable in the telecommunication industry.

The real-time requirements of a telecommunications switch place severe constraints on the exchanging of a new version of software containing error corrections or "bug fixes" for an old versions of software without disrupting the existing telecommunications traffic being processed by the switch. It is highly desirable in the telecommunications industry to have a method and system which provides the capability to exchange software within the switch during operation, without the need for any downtime.

Therefore, it would be highly useful within the telecommunications industry to be able to exchange software during actual operation of the telecommunications switch without disrupting ongoing telecommunications traffic within the switch. The present invention provides such a method and system.

SUMMARY OF THE INVENTION

An object of the present invention is to provide a method and system for exchanging an old software version for a new software version within a telecommunications switch without a restart of the switch.

In one aspect, the present invention is a method of exchanging a new software version for an old software version within a telecommunications switch without a restart of the switch. The switch includes memory, a software loading subsystem, a database management subsystem, and a program exchange subsystem. The method includes the steps of loading the new software version into the memory with the software loading subsystem, and registering the new software version in the program exchange subsystem with the database management subsystem. The method also includes the steps of passivating the old software version with the program exchange subsystem, and activating the registered new software version with the program exchange subsystem.

In another aspect, the present invention is a method of exchanging a new software version for an old software version within a telecommunications switch without a restart of the switch. The switch includes memory, a software loading subsystem, a database management subsystem, and a program exchange subsystem. The method includes the steps of loading the new software version into the memory with the software loading subsystem, and registering the new software version in the program exchange subsystem using the database management subsystem. The method further includes the steps of activating the registered new software version with the program exchange subsystem, and passivating the old software version with the program exchange subsystem. The method also includes the steps of confirming the activated new software version with the program exchange subsystem, and certifying the confirmed new software version with the program exchange subsystem.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF AN EXEMPLARY EMBODIMENT

Figure 1:
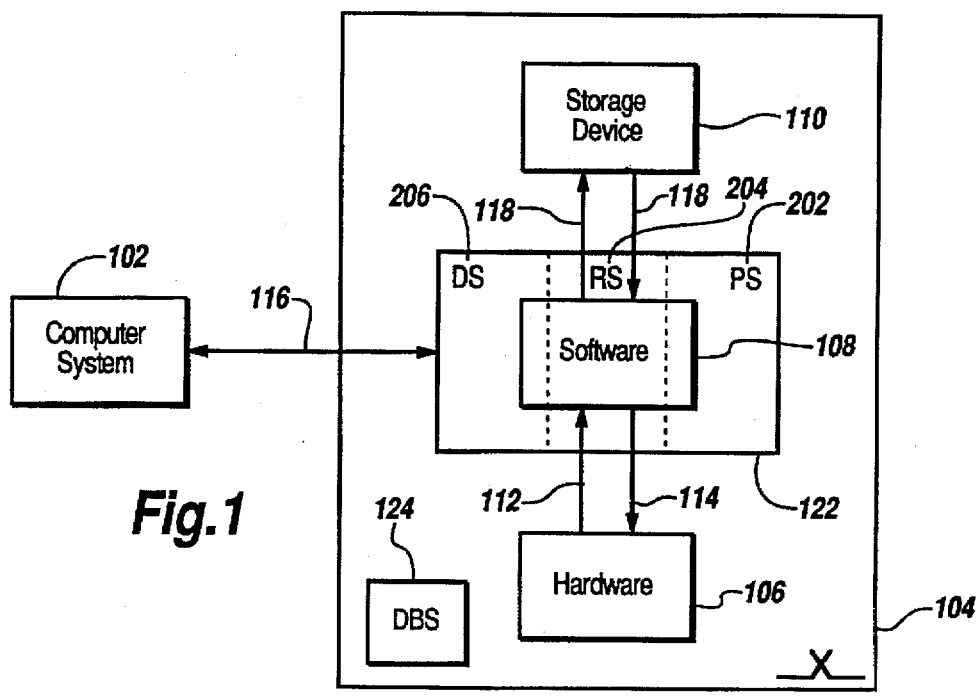
FIG. 1 is a block diagram illustrating a telecommunications switch and a computer system employed in a preferred embodiment of the present invention.

Referring now to FIG. 1, a block diagram is shown which illustrates a telecommunications switch 104 and a computer system 102 employed in a preferred embodiment of the present invention. The switch 104 comprises a storage device 110, software 108, hardware 106, memory 122, and a database management subsystem (DBS) 124. The switch 104 may be, for example, a stored program control switch such as AXE 10 produced by Telefonaktiebolaget LM Ericsson in Sweden. The storage device 110 may be, for example, a floppy drive, a hard drive, a magnetic tape drive, or an optical drive.

Figure 2:
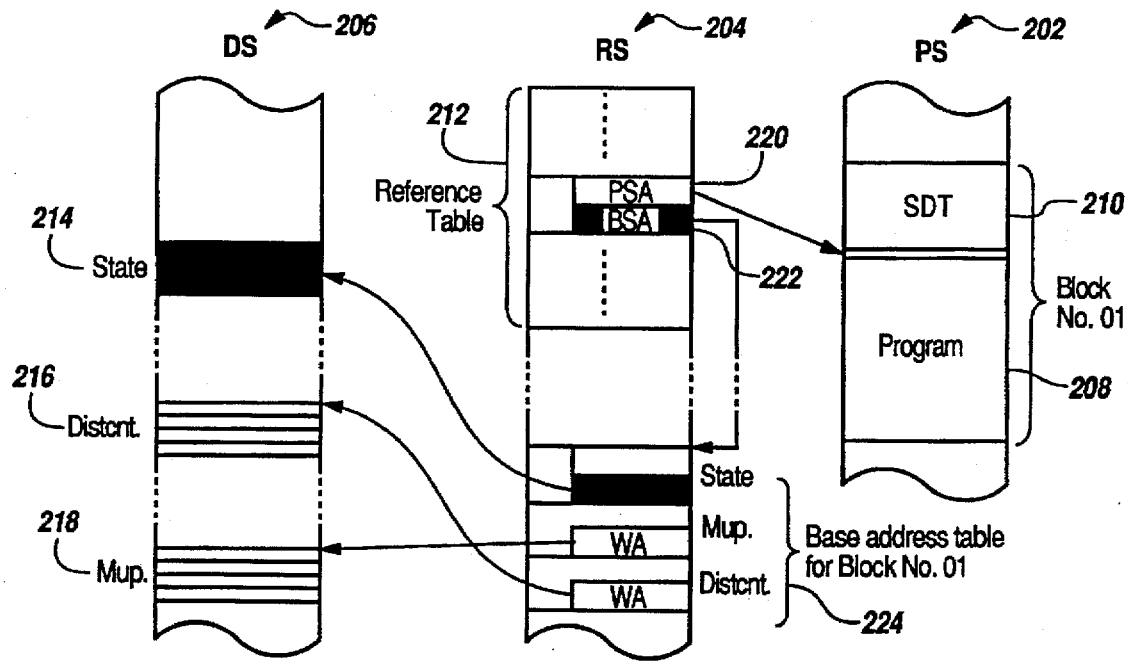
FIG. 2 is a block diagram illustrating in greater detail the structure and contents for the Program Storage are a, Reference Storage are a, and Data Storage area, of the memory of the telecommunications switch of FIG. 1 according to a preferred embodiment of the present invention.

As shown in greater detail in FIG. 2, the memory 122 is divided into a Data Storage (DS) area 206, a Reference Storage (RS) area 204, and a Program Storage (PS) area 202. The software 108 is loaded from the storage device 110 into memory 122, and resides within each of the PS 202, DS 206, and RS 204 areas. The software 108 is used to control the hardware 106 via communication paths 112 and 114 (FIG. 1). The computer system 102 communicates with the switch 104 via communication path 116. The computer system 102 may be, for example, an individual personal computer system, an operation and maintenance center system, a network manager center system, or other similar type of system. The DBS 124 may be, for example, a semi-relational database management system.

Referring now to FIG. 2, a block diagram is shown which illustrates in greater detail the structure and contents for each of the PS 202, RS 204, and DS 206 storage areas of the memory 122 of FIG. 1 according to a preferred embodiment of the present invention. The Program Store (PS) area 202 is used for storing a plurality of function blocks (computer programs) each of which is identified by a unique identification number. Each of the function blocks stored within the PS 202 area may have data such as variables associated with them. Any variables which are referenced by a function block stored within the PS 202 area, are stored separately in the DS area 206. Each variable stored within the DS area 206 is also identifiable by a unique variable identification number. The Reference Store (RS) 204 area is employed for determining the locations of function blocks stored within the PS area 202 and their associated variables stored within the DS area 206.

The RS area 204 employs a plurality of reference tables and base tables to track the various locations of the function blocks stored within PS area 202 and their associated variables within the DS area 206. Each function block which is stored within the PS area 202, has an associated reference table within the RS area 204 which is indexed according to the function block's unique identification number. Each variable used by a particular function block within the PS area 202 has its location within the DS area 206 specified in a Base Address Table (BAT). A reference table comprises a Program Start Address (PSA), and a Base Start Address (BSA). The PSA indicates the start address of an associated function block stored within the PS 202 area. The BSA indicates a location for a BAT, associated with the function block, stored within the RS area 204.

A Signal Distribution Table (SDT) exists at the start address of each function block stored within the PS area 202. The SDT specifies locations for tasks (procedures/functions) within the function block. An example of a function block 208 and its associated tables and variables is also shown in FIG. 2. Function block 208 is stored within the PS area 202, and is identifiable by function block number 01 (No. 01). An SDT 210 is located at the start address of function block 208, and is employed for locating specific tasks within function block 208. The function block 208 has an associated reference table 212 within the RS area 204. The reference table 212 is indexed within the RS area 204 by the function block No. 01. The reference table 212 comprises a PSA 220 and a BSA 222. The PSA 220 identifies the start address for function block 208. The BSA 222 identifies the location of a BAT 224 stored within the RS area 204. The BAT 224 identifies the locations of variables used by the function block 208. The variables may be, for example, variables state 214, Distcnt 216, and Mup 218.

The following description is an example of how a specified task within the function block 208 can be invoked. First, the RS area 204 is accessed and searched for any reference table indexed by the function block No. 01. In this particular example, reference table 212 matches the search. Next, PSA 220 is used to locate the start address for function block 208. The start address is used in conjunction with the specified task to access SDT 210 and invoke the specified task. During the execution of the specified task, function block 208 may require the use of variables state 214, Distcnt 216, or Mup 218. If function block 208 requires the use of the variables, then function block 208 uses BSA 222 to access BAT 224 to determine the locations of the variables within the DS area 206.

Figure 3:
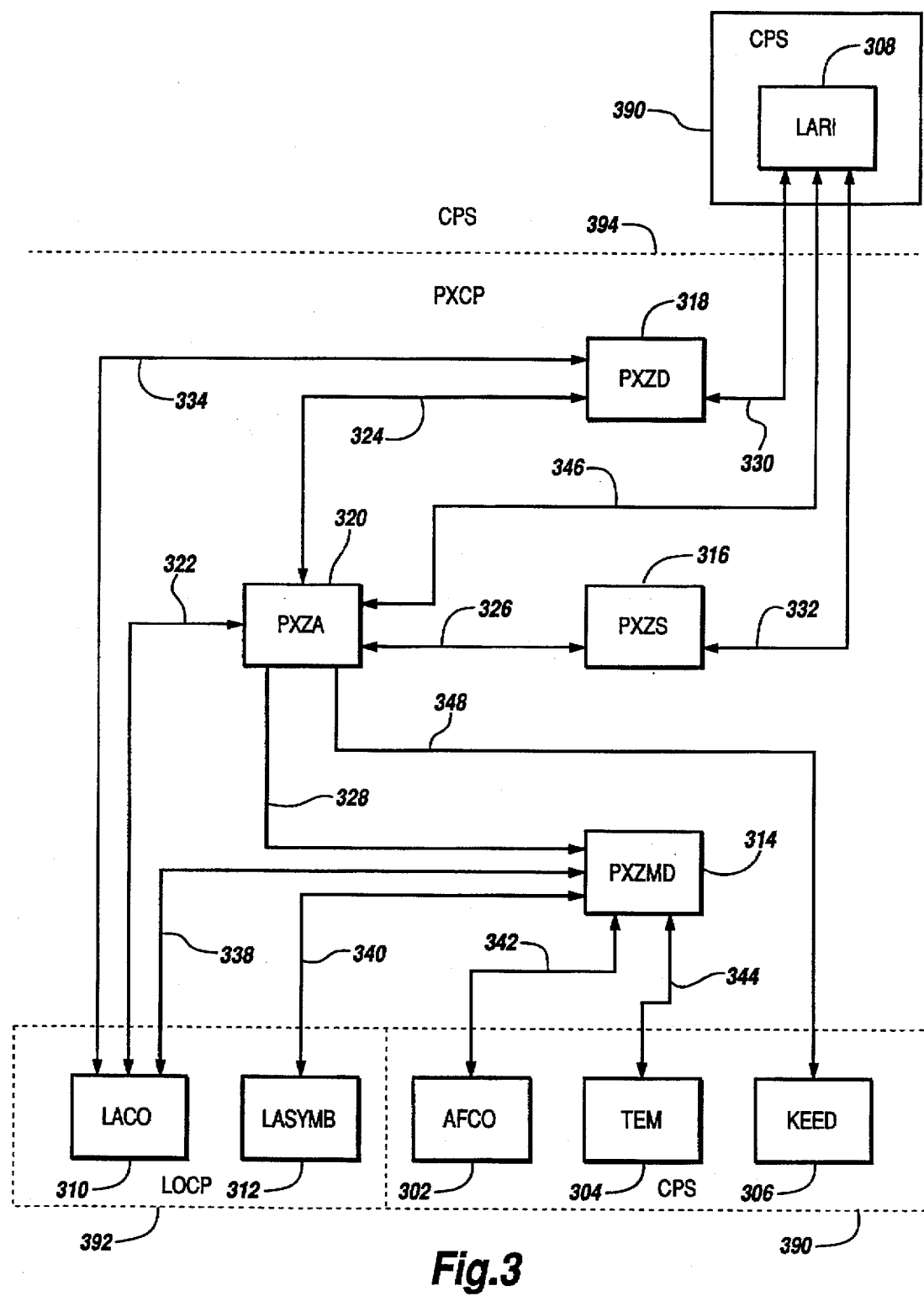
FIG. 3 is a block diagram illustrating the program exchange (PXCP) subsystem's components and their interactions with the components of a software loading subsystem, and a loading central processor subsystem within the telecommunications switch of FIG. 1 according to a preferred embodiment of the present invention.

Referring now to FIG. 3, a block diagram is shown which illustrates the subsystem program exchange (PXCP) 394 components and their interactions with the components of a software loading subsystem (CPS) 390, and a loading central processor subsystem (LOCP) 392 within the switch of FIG. 1 according to a preferred embodiment of the present invention. PXCP 394 comprises the following components: a program exchange administrator (PXZA) 320, a program exchange data difference handler (PXZD) 318, a program exchange signal difference handler (PXZS) 316, and a program exchange machine dependent routine (PXZMD) 314. PXCP 394 communicates with the following CPS 390 components: an audit function controller (AFCO) 302, a program test monitor (TEM) 304, a loading administrator reference information handler (LARI) 308, and a system event information broadcaster (KEED) 306. PXCP 394 also communicates with the following LOCP 392 components: a loading administration controller (LACO) 310, and a loading administration symbol handler (LASYMB) 312. Each of the components of the PXCP 394 and their interactions with the components of the CPS 390 and LOCP 392 are described briefly below.

PXZA 320 coordinates the program exchange implementation. PXZA 320 communicates with PXZD 318, PXZS 316, KEED 306, PXZMD 314, and LACO 310 via bi-directional logic paths 324, 326, 348, 328, and 322 respectively. PXZD 318 verifies compatibility between stored data variables for the old and new software units, and optimizes the amount of RS 204 and DS 206 areas required for the new software unit during the program exchange. PXZD 318 communicates with PXZA 320, LACO 310, and LARI 308 via hi-directional logic paths 324, 334, and 330 respectively. PXZS 316 verifies compatibility between signal interfaces for the old and new software units, and stores information concerning any differences between the signal interfaces. PXZS communicates with PXZA 320 and LARI 308 via communication paths 326 and 332 respectively. PXZMD 314 implements the program exchange using assembly routines to directly update the reference table and BAT for the new software unit. A different version of PXZMD which performs substantially the same function is required for each different hardware platform used in the AXE 10 switch. PXZMD 314 communicates with AFCO 302, TEM 304, LASYMB 312, LACO 310, and PXZA 320 via bi-directional communication paths 342, 344, 340, 338, and 328 respectively.

The communication signals which travel each of the logic paths 324, 326, 330, 332, 334, 338, 340, 342, 344, and 348 during the program exchange method are listed in Appendix A.

LACO 310 notifies PXCP 394 when a new software unit has been loaded for program exchange, and acts as an interface between the PXCP 394 and the CPS's 390 store functions. LASYMB 312 administers signal and variable name symbols for the new and old software units to be exchanged.

AFCO 302 performs the function of an interface between the PXCP 394 and the CPS's 390 audit functions. TEM 304 comprises central functions for a program test system. LARI 308 is machine-dependent, and comprises a plurality of service routines for reading and updating reference information used by the operating system (OS) of the switch 104 (FIG. 1).

Figure 4:
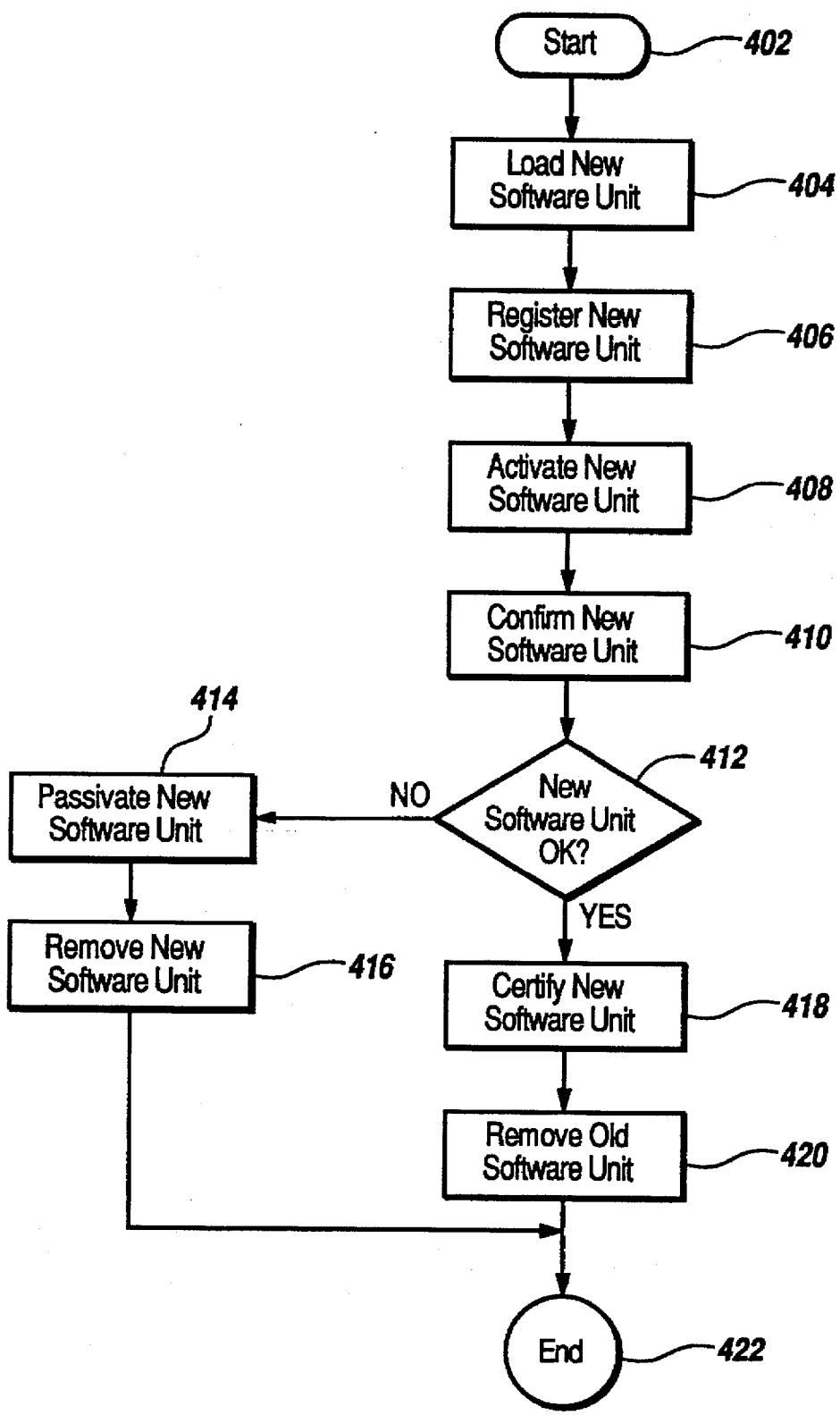
FIG. 4 is a flow chart which generally illustrates the steps of a program exchange method for exchanging a new software unit with an old software unit within the switch of FIG. 1 according to a preferred embodiment of the present invention.

Referring now to FIG. 4, a flow chart is shown which generally illustrates the steps of a program exchange method for exchanging a new software unit with an old software unit (function block) within the switch 104 of FIG. 1 according to a preferred embodiment of the present invention. The method begins at step 402 and proceeds to step 404 where a new software unit which is to be exchanged with an old software unit is loaded into the memory 122 of the switch 104 (FIG. 1). The method then proceeds to step 406 where the new software unit is registered, and the method continues to step 408 where the new software unit is activated. After the new software unit has been activated, the method proceeds to confirm the new software unit at step 410. The method then continues to step 412 where it is determined whether or not the new software unit is operating properly. If it is determined that the new software is operating properly, then the method proceeds to step 418. If, however, it is determined that the new software is operating improperly, then the method proceeds to step 414. At step 414, the new software unit is passivated, and the method proceeds to step 416 where the passivated new software unit is removed from the switch 104, and the method proceeds to end at step 422. At step 418 the new software unit is certified, and the method continues to step 420 where the old software unit is removed from the memory 122 of the switch 104 (FIG. 1), and the method proceeds to end at step 422. A detailed description of the above steps in FIG. 4 is provided below.

In a preferred embodiment of the present invention a command transaction within DBS 124 (FIG. 1) can be used to specify a plurality of new software units each one of which replaces an associated old software unit.

At step 404 of FIG. 4, the new software unit is loaded into the memory 122 of the switch 104 (i.e. PS 202, RS 204 and DS 206). After the new software unit has been successfully loaded for program exchange, the DBS 124 via LACO 310 uses PLEX-SQL (DBS) statements to insert exchange information into a PXPROGRAM database table. The exchange information may include, for example, the block name for the new software unit, the block number of the old and new software units, the product number of the old and new software units, and the R-STATE of the old and new software units. The loading of the exchange information into the PXPROGRAM table results in the new software unit being registered at step 406.

Figure 5:
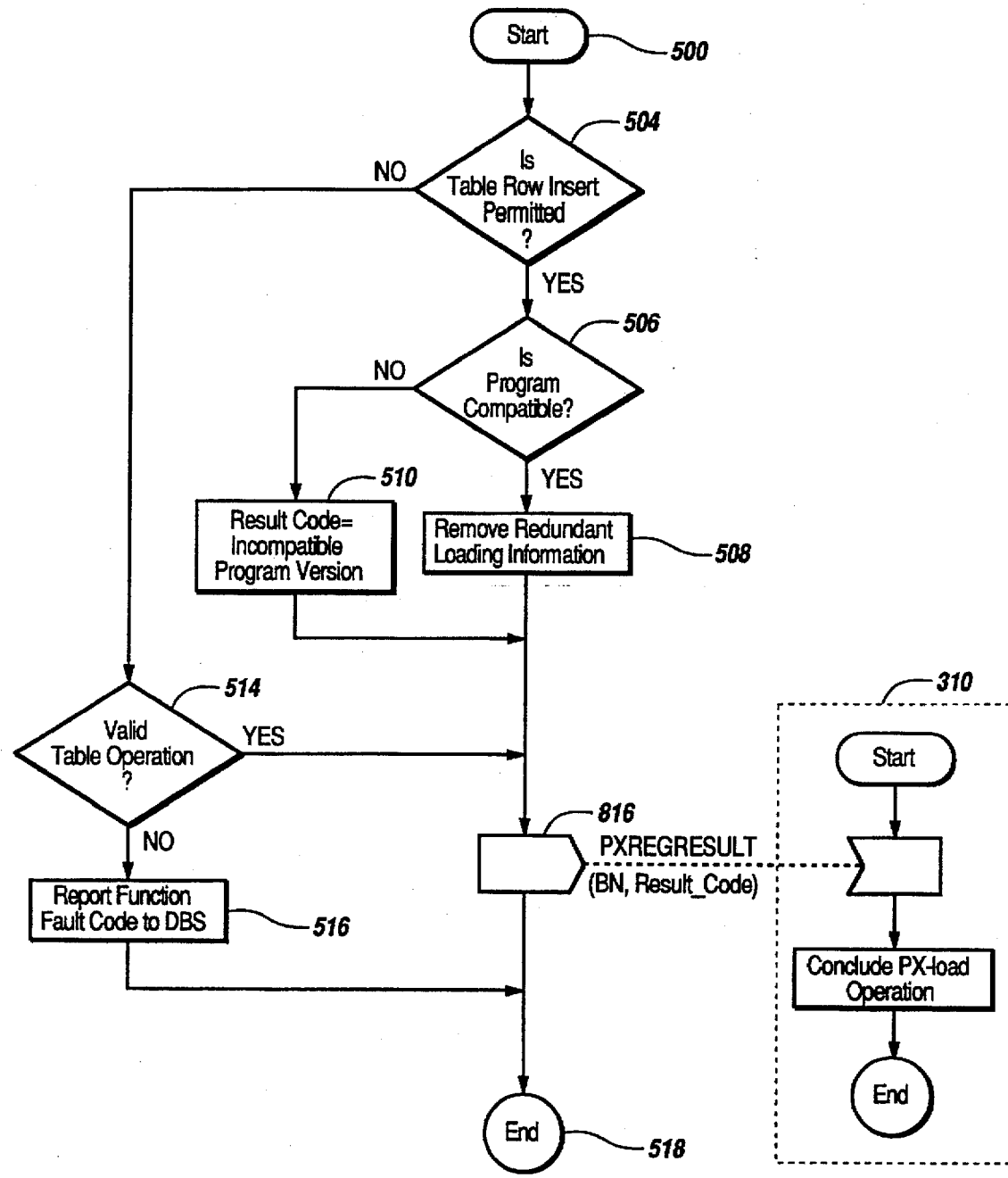
FIG. 5 is a flow chart which illustrates in greater detail the registration step of the new software unit in FIG. 4 according to a preferred embodiment of the present invention.

Referring now to FIG. 5, a flow chart is shown which illustrates in greater detail the registration of the new software unit at step 406 of FIG. 4 according to a preferred embodiment of the present invention. The registration of the new software unit begins at step 500 and proceeds to step 504 where the method determines whether or not a table row insert into the PXPROGRAM table is permitted. A table row must be inserted in the PXPROGRAM table by the program exchange subsystem (PXCP) 394 (FIG. 3) and not by an operator. If it is determined that the table row insert is permitted, then the method proceeds to step 506. If, however, it is determined that the table row inserted is not permitted then the method proceeds to step 514.

At step 506, it is determined whether or not the new software unit is compatible with the old software unit. A new software unit is compatible with an old software unit when the following exists within the new software unit: the block type and the block type-External are the same as the old software unit's block type and block type-External, no corrections exist within the correction area, the signal interface is compatible with the signal interface of the old software unit, and the structure of the variables is compatible with the structure of the old software unit's variables. PXZS 316 performs the determination of whether the signal interfaces of the old and new software units are compatible. The signal interfaces are compatible if they are identical. PXZD 318 also determines whether the structure of the variables for the old and new software units is compatible. PXZD 318 stores any compatible variable differences in a VARIABL-EDIFF database table within the DBS 124 (FIG. 1). If it is determined that the new software unit is compatible, then the method proceeds to step 508. If, however, it is determined that the new software unit is incompatible, then the method proceeds to step 510.

At step 508, identical variables within the new software unit that currently exist within the old software are removed from the new software unit. The identical variables may be removed in order to save DS area 206 (FIG. 2) space, since the new software unit inherits the old software unit's variables. After the identical variables have been removed from the new software unit, the new software unit's BAT is compressed so that only one position exists for each added, changed or deleted variable. After the new software unit's BAT has been compressed, the VARIABLEDIFF table is updated to define mapping between positions for variables within the compressed BAT and variables within the old software unit's BAT. The method then continues to step 512. At step 510, a variable result_code is set to indicate that the new software unit is incompatible with the old software unit, and the method proceeds to step 512. At step 514, it is determined whether or not a valid table operation was performed. If it is determined that a valid table operation was performed, then the method proceeds to step 512. If, however, it is determined that an invalid table operation was performed, then the method proceeds to step 516.

At step 516, a fault indicating that an invalid table operation was performed is returned to the DBS 124 (FIG. 1), and the method proceeds to end at step 518. At step 512, a function within LACO 310 (FIG. 3) is invoked, and the method proceeds to end at step 518. The invoked function in LACO 310 concludes the registration of the new software unit.

Figure 6A:
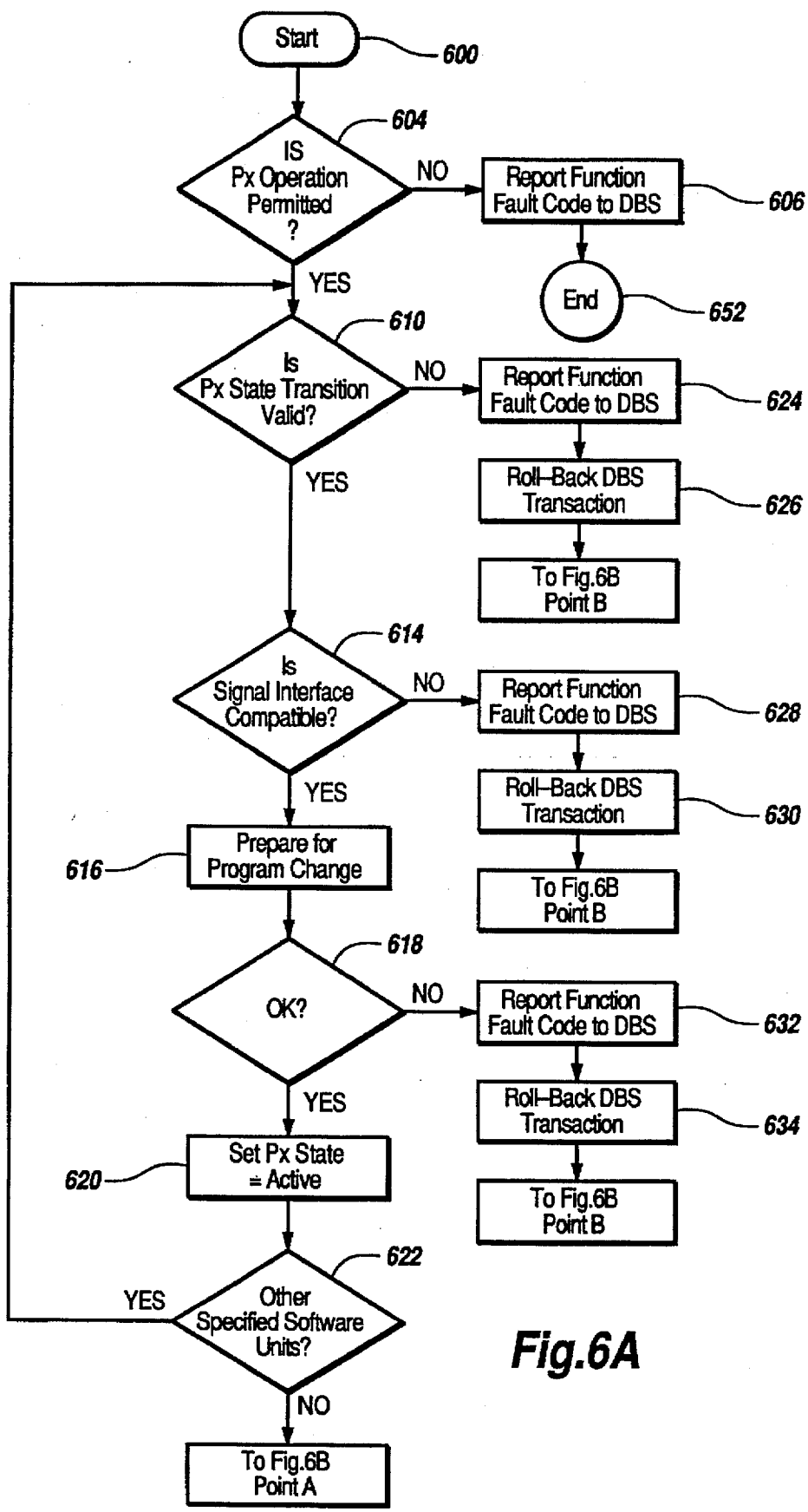
FIGS. 6A–6B are a flow chart illustrating in greater detail the activation step of the new software unit in FIG. 4 according to a preferred embodiment of the present invention.
Figure 6B:
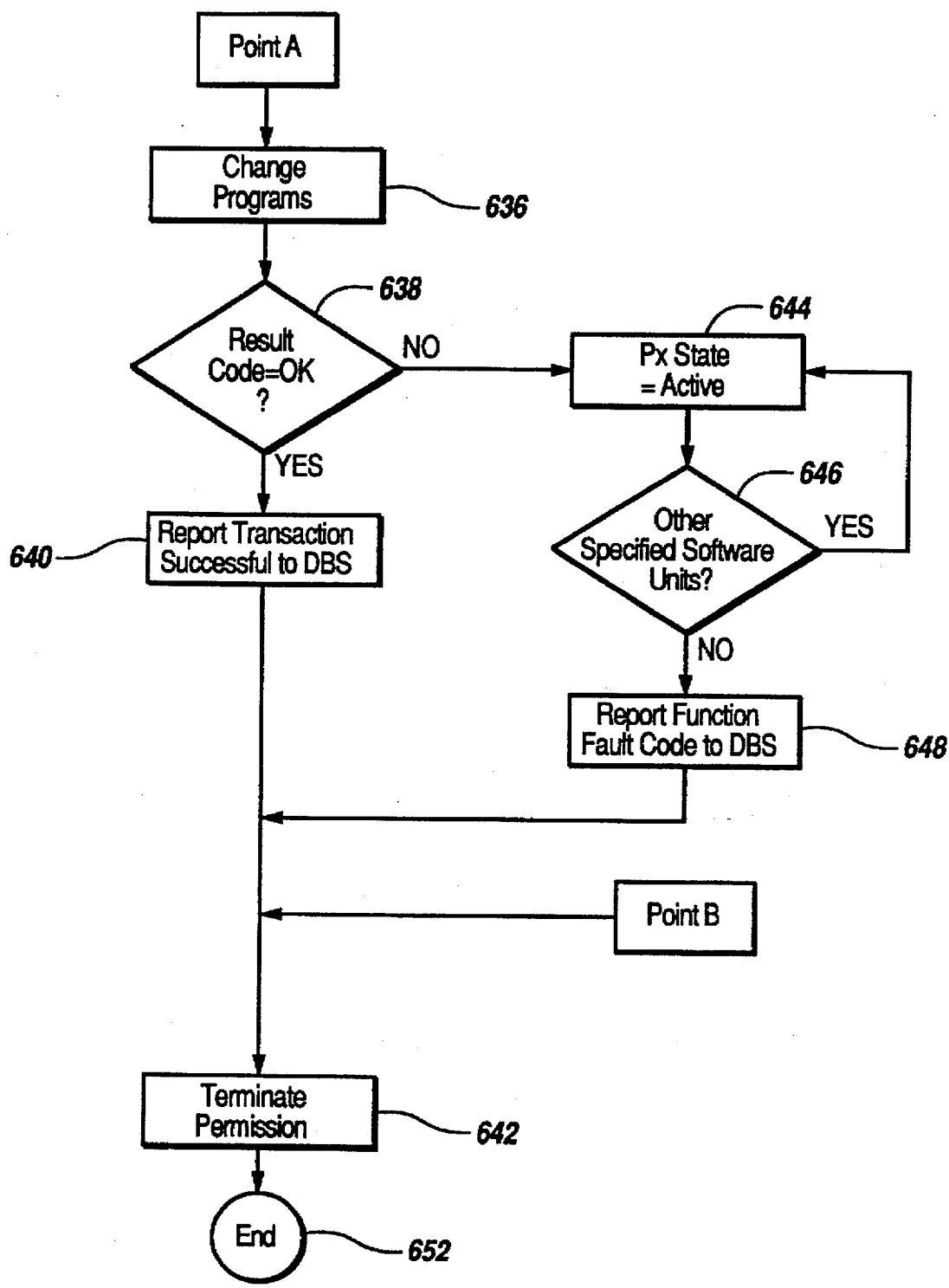

FIGS. 6A–6B are a flow chart illustrating in greater detail the activation of the new software unit at step 408 of FIG. 4 according to a preferred embodiment of the present invention. The activation of the new software unit is performed by PXZA 320 (FIG. 3). The activation of the new software unit is initiated by generic DBS commands which enable the new software unit to be executed. If a system restart of the switch 104 occurs during the program exchange process, then the "ACTIVE" new software unit is passivated. Hereinafter, the term passivated is used to define a software unit which is capable of executing but is denied permission.

Referring now to FIG. 6A, the activation of the new software units specified within the PXPROGRAM table begins at step 600 and proceeds to step 604 where it is determined whether or not permission to update the system reference information is granted from LACO 310. If it is determined that LACO 310 grants permission, then the method proceeds to step 610. If, however, it is determined that LACO 310 denies permission, then the method proceeds to step 606 where a function fault code is reported to the DBS 124 (FIG. 1), and the method proceeds to end at step 652.

At step 610, the PXPROGRAM table is accessed to select a new software unit and an old software unit specified therein; and it is determined whether or not the program exchange state is valid for the selected new and old software units. A new software unit's program exchange state is valid when it equals "ACTIVE". The program exchange state of an old software unit is valid when it equals "INACTIVE". If it is determined that the program exchange states (PXSTATEs) for the selected new and old software units are valid, then the method proceeds to step 614. If, however, it is determined that the exchange states for the selected new and old software units are invalid, then the method proceeds to step 624. At step 624, a fault code is returned to DBS 124 (FIG. 1), and the method proceeds to step 626 where the selected new and old software units are rolled back to their respective previous conditions, and the method proceeds to step 642 (FIG. 6B).

At step 614, it is determined whether or not the signal interfaces of the selected old and new software units are compatible. The signal interfaces of the old and new software units may be incompatible for numerous reasons. For example, a signal correction may be inserted in the old software unit (i.e., the "ACTIVE" unit) during a period of time which can exist between the loading and activation of the new software unit. Differences between the signal interfaces of the selected old and new software units are not allowed, since signal linking information is not updated during the program exchange. The determination of the compatibility of the signal interfaces of the selected old and new software units is implemented in PXZS 316 (FIG. 3). If PXZS 316 determines that the signal interfaces for the selected old and new software units are compatible, then the method proceeds to step 616. If, however, PXZS 316 determines that the signal interfaces are incompatible, then the method proceeds to step 628. At step 628, a fault code is returned to DBS 124 (FIG. 1), and the method proceeds to step 630 where the selected old and new software units are rolled back to their respective previous conditions, and the method proceeds to step 642 (FIG. 6B).

At step 616, preparation for program exchange is performed. The preparation includes having PXZA 320 send the block numbers for the selected new and old software units to PXZMD 314 (FIG. 3). PXZMD 314 then assembles information concerning the reference table positions, base address table positions, and variable area information words, which will be updated during the program exchange. The method then proceeds to step 618, where it is determined whether or not the preparation for the program exchange was successful. If it is determined that preparation for the program exchange was successful, then the method proceeds to step 620. If, however, it is determined that preparation for the program exchange was unsuccessful, then the method proceeds to step 632. At step 632, a fault code is returned to DBS 124 (FIG. 1), and the method proceeds to step 634 where the selected old and new software units are rolled back to their respective previous conditions, and the method proceeds to step 642 (FIG. 6B). At step 620, PXZA 320 (FIG. 3) sets the program exchange state (PXSTATE) to "ACTIVE" for the selected new software unit, and the method proceeds to step 622. The activation of the specified new software units is terminated if too large of a number of new software units are specified in the DBS command transaction. At step 622, the method determines if there are other new software units specified for activation within the PXPROGRAM table. If it is determined that other new software units specified for activation within the PXPROGRAM table, then the method proceeds back to step 610 and repeats the above enumerated steps for a different selected new software unit and old software unit. If, however, it is determined that there are no other new software units specified for activation within the PXPROGRAM table, then the method proceeds to step 636 (FIG. 6B).

Referring now to FIG. 6B, at step 636, the old and new software units specified in the PXPROGRAM table are exchanged. The exchange is initiated by PXZA 320 (FIG. 3) ordering an increase in size for the base address tables of the specified new software units which have variables in addition to the existing variables of the old software units which they replace. In contrast, PXZA 320 orders a decrease in the size of the base address table for specified new software units which have fewer variables as compared to the existing variables of the old software units which they replace.

PXZA 320 proceeds with the program exchange by sending a signal to PXZMD 314 to perform the "low level" (computer platform dependent) implementation of the program exchange. In response to the signal, PXZMD 314 removes any trace measures that may have been set for the specified software units subject to the program exchange. PXZMD 314 then proceeds with the program exchange by disabling high priority level interrupts. During the time that the high priority level interrupts are disabled, PXZMD 314 proceeds to copy data from the reference table, BAT, and variables, of each one of the specified old software units to the respective new software units that replace them. PXZMD 314 then reenables the high priority level interrupts, and orders AFCO 302 (FIG. 3) to switch the program store checksums for the specified old and new software units. PXZMD 314 also orders LASYMB 312 to switch the variable symbol information for the specified old and new software units.

At step 638, the variable result_code is examined to determine whether or not the program exchange was successful. If it is determined that the variable result_code indicates that the program exchange was successful, then the method proceeds to step 640. If, however, it is determined that the variable result_code indicates that the program exchange was unsuccessful, then the method proceeds to step 644. At step 644, the PXPROGRAM table is accessed to select a new software unit specified for activation therein. The program exchange state (PXSTATEs) of the selected new unit is set equal to "INACTIVE", and the method proceeds to step 646. At step 646, it is determined whether other new software units specified for activation exist within the PXPROGRAM table. If it is determined that other new software units specified for activation exist within the PXPROGRAM table, then the method proceeds to step 644 and repeats the above step for a different selected new software unit. If, however, it is determined that there are no other new software units specified for activation within the PXPROGRAM table, then the method proceeds to step 648. At step 648, a function fault code is returned to DBS 124 (FIG. 1), and the method proceeds to step 642.

At step 640, a report is returned to the DBS 124 (FIG. 1) indicating that the transaction was successful and the method proceeds to step 642 where permission for updating the system reference information is relinquished, and the method proceeds to end at step 652.

Figure 7:
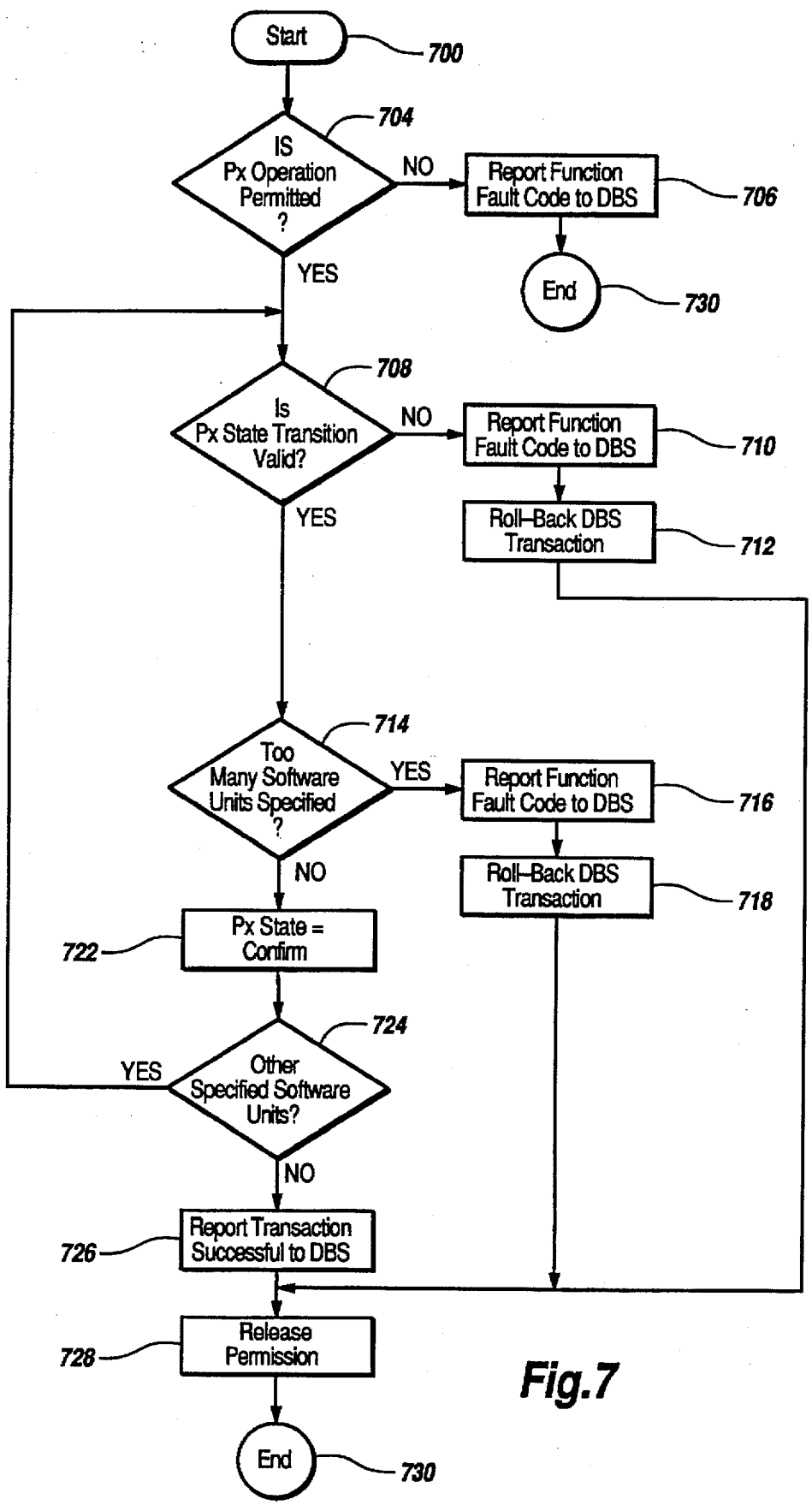
FIG. 7 is a flow chart which illustrates in greater detail the confirmation step of the new software unit in FIG. 4 according to a preferred embodiment of the present invention.

Referring now to FIG. 7, a flow chart is shown which illustrates in greater detail the confirmation of the new software unit at step 410 of FIG. 4 according to a preferred embodiment of the present invention. Confirmation of the new software unit begins at step 700 and proceeds to step 704 where it is determined whether or not access to the system reference information is permitted. In order to gain access to the system reference table, PXZA 320 (FIG. 3) sends a signal to LACO 310 (FIG. 3) requesting the permission. If LACO 310 grants permission, then the method proceeds to step 708. If, however, LACO 310 refuses permission, then the method proceeds to step 706 where a fault code is reported to the DBS 124 (FIG. 1), and the method proceeds to end at step 730.

At step 708, the PXPROGRAM table is accessed to select a new software unit specified for confirmation, and it is determined whether or not the selected new software unit's program exchange state (PXSTATE) is valid. A selected new software unit's PXSTATE is valid when it equals "ACTIVE". If it is determined that the selected new software unit's PXSTATE is invalid, then the method proceeds to step 710. If, however, it is determined that the selected new software unit's PXSTATE is valid, then the method proceeds to step 714. At step 710, a function fault code is returned to DBS 124 (FIG. 1), and the method proceeds to step 712 where the selected new software unit is rolled-back to its previous condition. The method then proceeds to step 728.

At step 714, it is determined whether or not too large of a number of new software units are specified within the DBS command transaction for confirmation. If it is determined that too many new software units are specified for confirmation, then the method proceeds to step 716. If, however, it is determined that the number of new software units specified for program exchange is acceptable, then the method proceeds to step 722. At step 716, a function fault code is returned to DBS 124 (FIG. 1), and the method proceeds to step 718 where the selected new software unit is rolled back to its previous condition, and the method proceeds to step 728.

At step 722, the program exchange state for the selected new software unit is set equal to "CONFIRM", and the method proceeds to step 724 where it is determined whether or not other new software units specified for confirmation exist within the PXPROGRAM table. If it is determined that other new software units exist within the PXPROGRAM table, then the method proceeds back to step 708 and repeats the above enumerated steps for a different new software unit. If, however, it is determined that no other new software units specified for confirmation exist within the PXPROGRAM table, then the method proceeds to step 726, where a report that the transaction was successful is returned to DBS 124 (FIG. 1), and the method proceeds to step 728 where permission for updating the system reference information is relinquished, and the method proceeds to end at step 730.

Figure 8A:
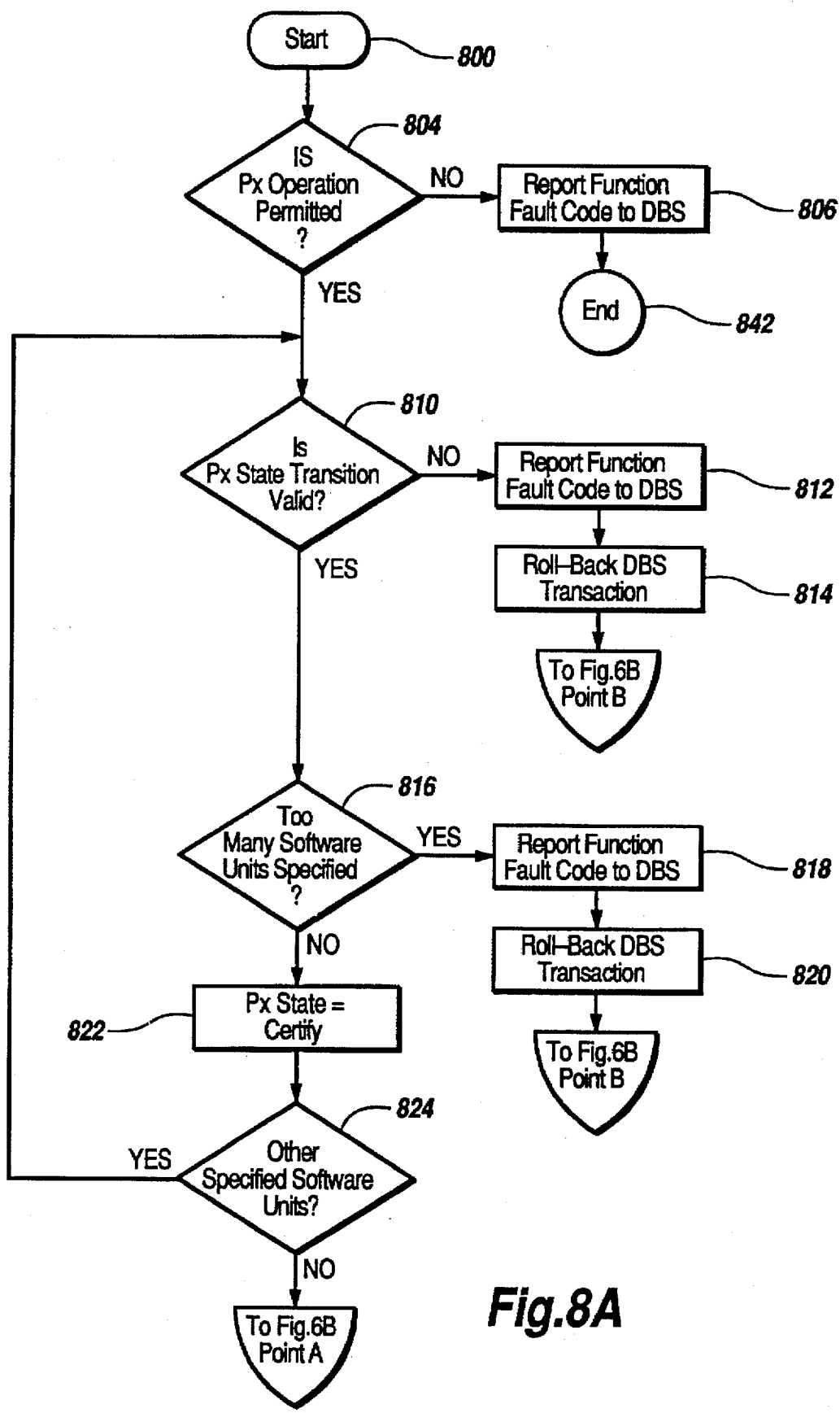
FIGS. 8A–8B are a flow chart illustrating in greater detail the certification step of the new software unit in FIG. 4 according to a preferred embodiment of the present invention.
Figure 8B:
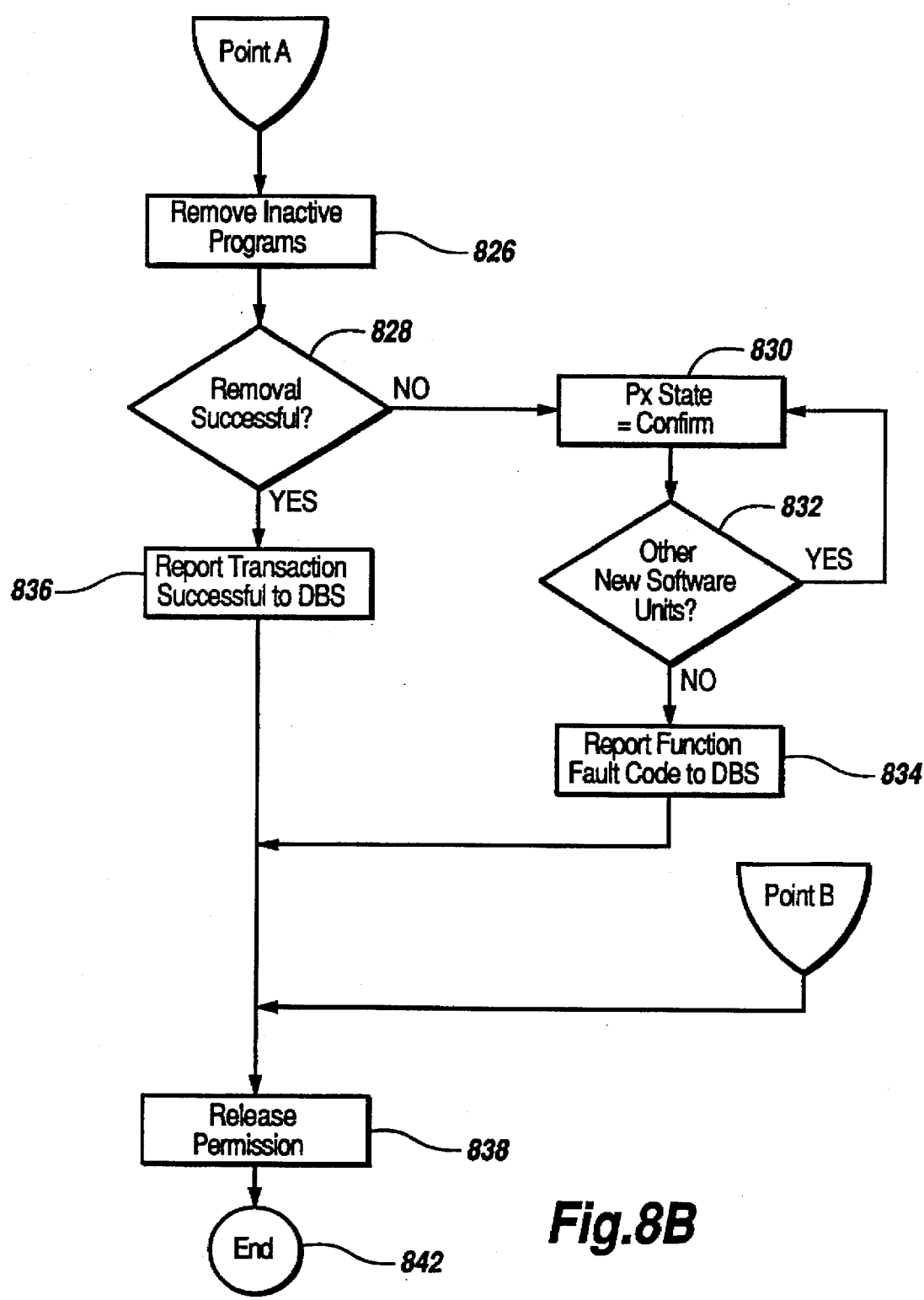

Referring now to FIGS. 8A–8B, a flow chart is shown which illustrate in greater detail the certification of a new software unit at step 418 of FIG. 4 according to a preferred embodiment of the present invention. The certification process certifies one or more confirmed new software units, and removes the associated old versions of software units from the system. Once a specified new software unit has been certified, there is no possibility of roll back for the certified new software unit or the old software unit it replaced. However, the replaced old software unit can be removed from the switch 104 (FIG. 1) and reloaded for program exchange with the confirmed new software unit. Alternatively, the switch may be reloaded with an earlier system backup.

The certification method begins at step 800 and proceeds to step 804 where it is determined whether or not access to the system reference information is allowed. PXZA 320 (FIG. 3) sends a signal to LACO 310 (FIG. 3) to request permission to update the system reference information. If LACO 310 refuses permission, then the method proceeds to step 806. If, however, LACO 310 grants permission, then the method proceeds to step 810.

At step 806, a fault code is returned to the DB$ 124 (FIG. 1), and the method proceeds to end at step 842. At step 810, the PXPROGRAM table is accessed and a new software unit specified for certification is selected; and it is determined whether or not the selected new software unit's program exchange state (PXSTATE) is valid. A selected new software unit's PXSTATE is valid when it is equal to "CERTIFY". If it is determined that the selected new software unit's PXSTATE is valid, then the method proceeds to step 816. If, however, it is determined that the new software unit's PXSTATE is invalid, then the method proceeds to step 812. At step 812, a function fault code is reported to DBS 124 (FIG. 1), and the method proceeds to step 814 where the selected new software unit is rolled back to its previous condition, and the method proceeds to step 838 (FIG. 8B).

At step 816, it is determined whether or not too large of a number of new software units are specified in a DBS command transaction for certification. If it is determined that too large of a number of new software units are specified for certification, then the method proceeds to step 818. If, however, it is determined that the number of new software units specified for certification is acceptable, then the method proceeds to step 822.

At step 818, a fault code is returned to DBS 124 (FIG. 1), and the method proceeds to step 820 where the selected new software unit is rolled back to its previous condition, and the method proceeds to step 838 (FIG. 8B). At step 822, PXZA 320 (FIG. 3) sets the selected new software unit's program exchange state (PXSTATE) equal to "CERTIFY", and the method proceeds to step 824. At step 824, it is determined whether or not other new software units specified for certification exist within the PXPROGRAM table. If it is determined that other new software units specified for certification exist within the PXPROGRAM table, then the method proceeds back to step 810 and repeats the above enumerated steps for a different new software unit. If, however, it is determined that other new software units specified for certification do not exist within the PXPROGRAM table, then the method proceeds to step 826 (FIG. 8B).

Referring now to FIG. 8B, at step 826, PXZA 320 transmits the block names of the specified old software units which are to be removed to LACO 310 (FIG. 3). PXZA 320 then orders LACO 310 to remove the specified old software units which are located at the respective program exchange block numbers. PXZA 320 also removes the program exchange information from the PXPROGRAM table for each specified old software unit successfully removed by LACO 310.

At step 828, it is determined whether or not the removal of all specified old software units was successful. If it is determined that the removal of all the specified old software units was successful, then the method proceeds to step 836. If, however, it is determined that the removal of any specified old software unit was unsuccessful, then the method proceeds to step 830. At step 830, a new software unit specified for certification is selected from the PXPROGRAM table, and the selected new software unit's program exchange state is set equal to "CONFIRM". The method then proceeds to step 832 where it is determined whether other new software units specified for certification exist within the PXPROGRAM table. If it is determined that other new software units specified for certification exist within the PXPROGRAM table, then the method proceeds back to step 830, and repeats the above enumerated step for a different new software unit. If, however, it is determined that no other new software units specified for certification exist within the PXPROGRAM table, then the method proceeds to step 834 where a fault code is reported to the DBS 124 (FIG. 1), and the method proceeds to step 838.

At step 836, an indication that the certification was successful is returned to DBS 124 (FIG. 1), and the method proceeds to step 840 where permission for updating the system reference information is relinquished, and the method proceeds to end at step 842.

Figure 9A:
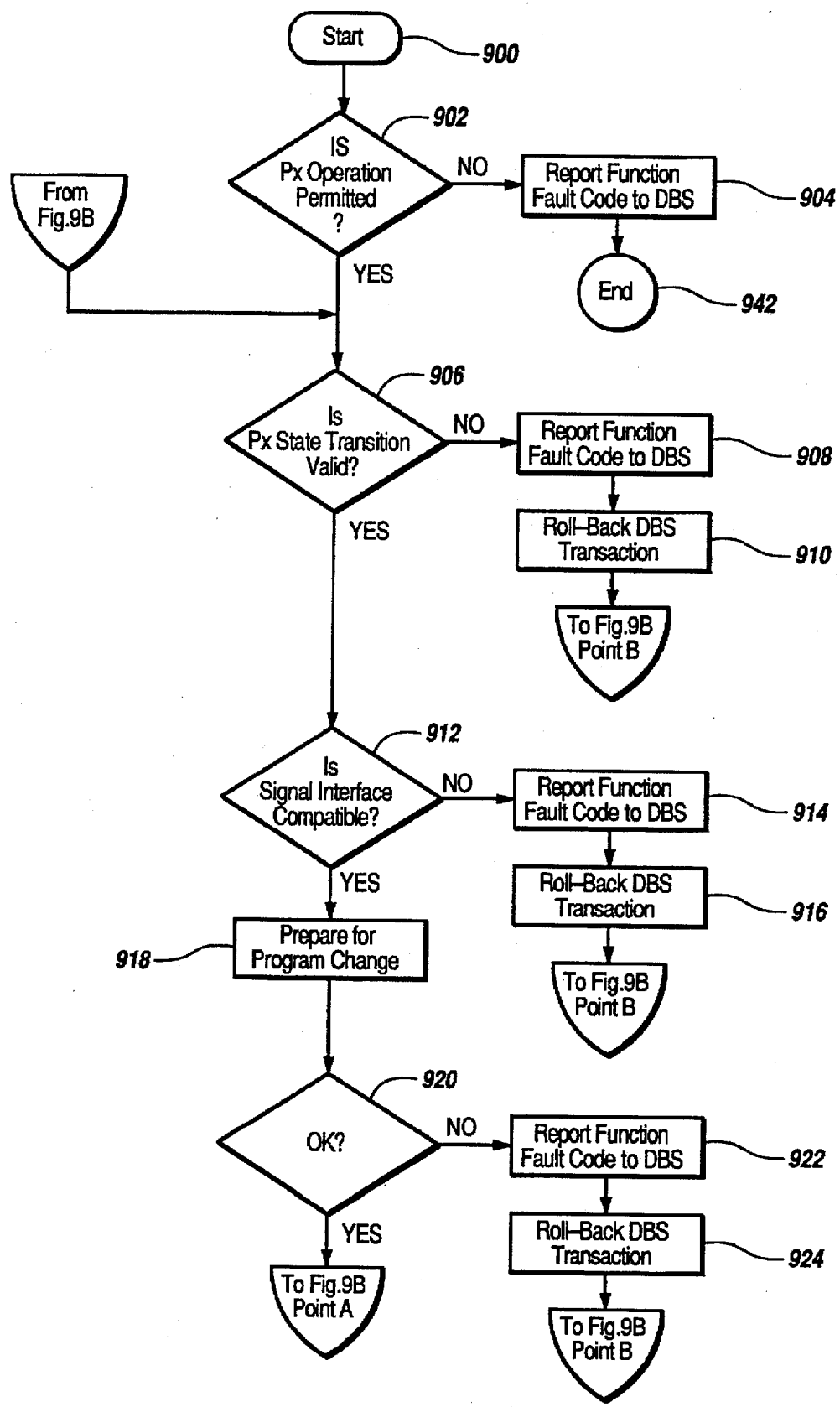
FIGS. 9A–9B are a flow chart illustrating in greater detail the passivation step of the new software unit in FIG. 4 according to a preferred embodiment of the present invention.
Figure 9B:
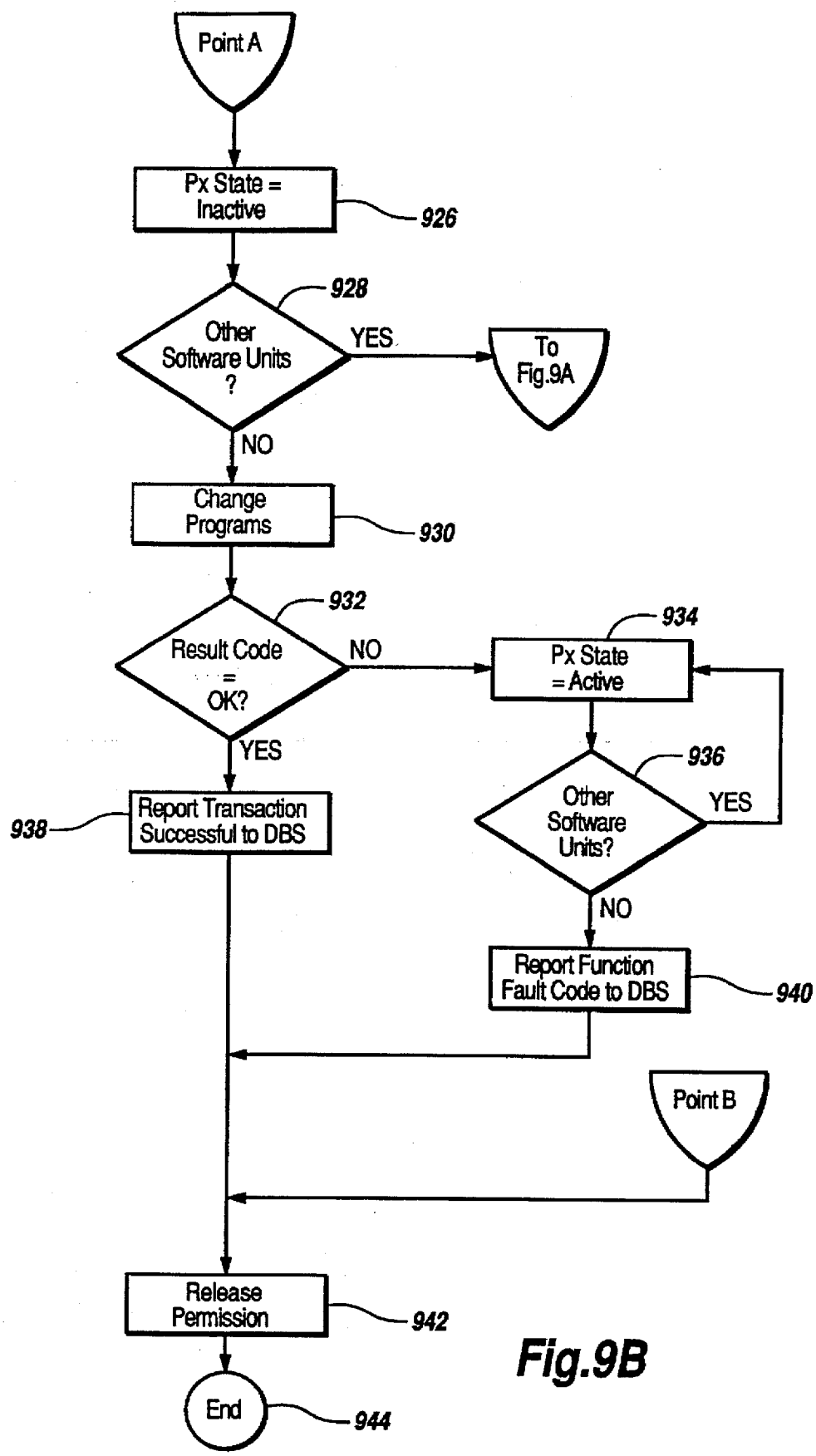

Referring now to FIGS. 9A–9B, a flow chart is shown which illustrates in greater detail the passivation of the new software unit at step 414 of FIG. 4 according to a preferred embodiment of the present invention. The passivation method begins at step 900 and proceeds to step 902 where PXZA 320 sends a signal to LACO 310 requesting permission to update the system reference information. If LACO 310 grants permission, then the method proceeds to step 906. If, however, LACO 310 refuses permission, then the method proceeds to step 904 where a fault code is returned to DBS 124 (FIG. 1), and the method proceeds to end at step 942.

At step 906, the PXPROGRAM table is accessed and a new software unit specified for passivation and its associated old software unit are selected; and it is determined whether or not the program exchange state is valid for the selected old and new software units. A selected new software unit's program exchange state is valid when it is equal to "INACTIVE". The program exchange state of a selected old software unit is valid when it is equal to "ACTIVE" or "CONFIRM". If the selected new and old software units have valid program exchange states, then the method proceeds to step 912. If, however, either of the selected old or new software units have an invalid program exchange state, then the method proceeds to step 908 where a fault code is returned to DBS 124 (FIG. 1), and the method proceeds to step 910. At step 910, the selected old and new software units are rolled back to their previous respective conditions, and the method proceeds to step 942 (FIG. 9B).

At step 912, it is determined whether or not the signal interfaces of the selected old and new software units are compatible. Differences in the signal interfaces are not allowed since PXCP 318 does not update signal linking information during the program exchange. PXZA 320 orders PXZS 316 to implement the compatibility verification. If it is determined that the signal interfaces are compatible, then the method proceeds to step 918. If, however, it is determined that the signal interfaces are incompatible, then the method proceeds to step 922 where a fault code is reported to DBS 124 (FIG. 1), and the method proceeds to step 924. At step 924, the selected old and new software units are rolled back to their previous respective conditions, and the method proceeds to step 942 (FIG. 9B).

At step 918, preparation for the program exchange takes place. The preparation begins with PXZA 320 (FIG. 3) ordering an increase in the selected old software unit's base address table, if the selected old software unit has variables in addition to the existing variables of the new software unit to be replaced. In contrast, PXZA 320 orders a decrease in the selected old software unit's base address table, if the selected old software unit has fewer variables than the existing variables of the new software unit to be replaced. After the preparation for the program exchange has been performed, the method proceeds to step 920 where it is determined whether or not the preparations were successful. If it is determined that the preparations were successful, then the method proceeds to step 926 (FIG. 9B). If, however, it is determined that the preparations were unsuccessful, then the method proceeds to step 922 where a fault code is returned to DBS 124 (FIG. 1), and the method proceeds to step 924. At step 924, the selected old and new software units are rolled back to their previous respective conditions, and the method proceeds to step 942 (FIG. 9B).

Referring now to FIG. 9B, at step 926, the program exchange state (PXSTATE) for the selected new software unit is changed to "INACTIVE", and the method proceeds to step 928. At step 928, it is determined whether or not other pairs of new and old software units specified for passivation exist within the PXPROGRAM table. If it is determined that specified paris of new and old software units exist within the PXPROGRAM table, then the method proceeds back to step 906, and repeats the above enumerated steps for a different pair of new and old software units. If, however, it is determined that there are no other specified pairs of old and new software units within the PXPROGRAM table, then the method proceeds to step 930. At step 930, the exchange of the pairs of old and new software units specified for passivation is performed. The exchange is implemented by having PXZMD 314 order TEM 304 to remove any trace measures that may have been set for the specified old and new software units. PXZMD 314 also disables higher priority level interrupts such as a traffic handling level (THL). During the time period in which the higher priority level interrupts are disabled, PXZMD 314 (FIG. 3) copies data from each of the specified new software unit's reference table, BAT, and variables, to an associated old software unit which replaces the new software unit. PXZMD 314 then re-enables the higher level interrupts, orders AFCO 302 to switch the PS check sums, and orders LASYMB 312 to switch the variable symbol information for the specified old and new software units. A variable result_code is also set to equal a value indicating whether or not the program exchange was successful. The method then proceeds to step 932, where the variable result_code is analyzed to determine whether or not the program exchange was successful. If it is determined that the variable result_code indicates that the program exchange was successful, then the method proceeds to step 938. If, however, it is determined that the variable result_code indicates that the program exchange was unsuccessful, then the method proceeds to step 934.

At step 934, the PXPROGRAM table is accessed and a new and an old software unit specified for passivation are selected. In addition, the selected new software unit's program exchange state is set equal to "ACTIVE", and the method proceeds to step 936. At step 936, it is determined whether other pairs of new and old software units specified for passivation exist within the PXPROGRAM table. If it is determined that other specified pairs of new and old software units exist within the PXPROGRAM table, then the method proceeds back to step 934 and repeats the above enumerated step with a different new software unit. If, however, it is determined that other specified pairs of old and new software units do not exist within the PXPROGRAM table, then the method proceeds to step 940. At step 940, a fault code is returned to the DBS 124 (FIG. 1), and the method proceeds to step 942. At step 938, an indication that the program exchange was successful is returned to the DBS 124 (FIG. 1), and the method proceeds to step 942. At step 942, permission for updating the system reference information table is relinquished, and the method proceeds to end at step 944.

Figure 10A:
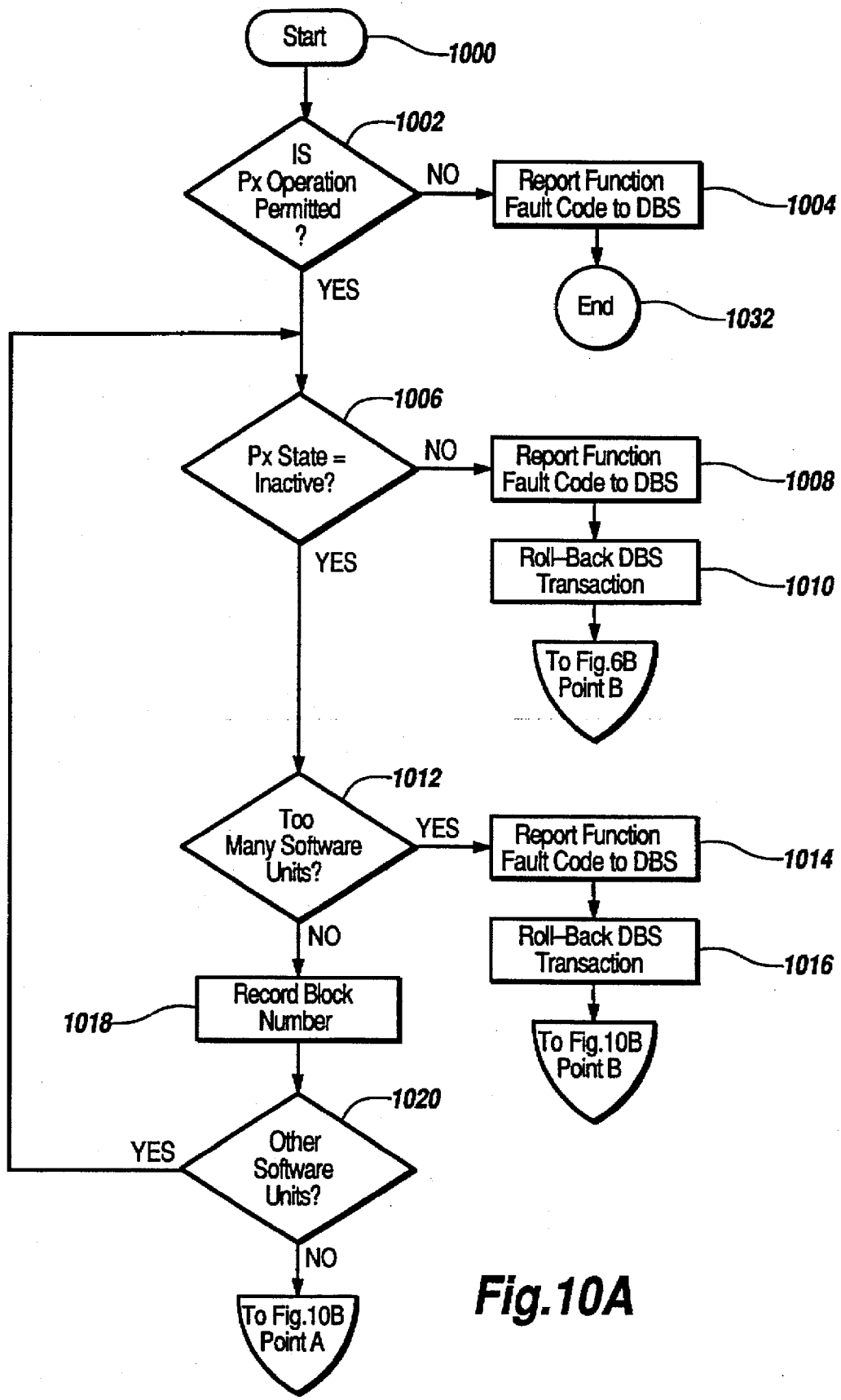
FIGS. 10A–10B are a flow chart illustrating in greater detail the step of removing the new software unit in FIG. 4 according to a preferred embodiment of the present invention.
Figure 10B:
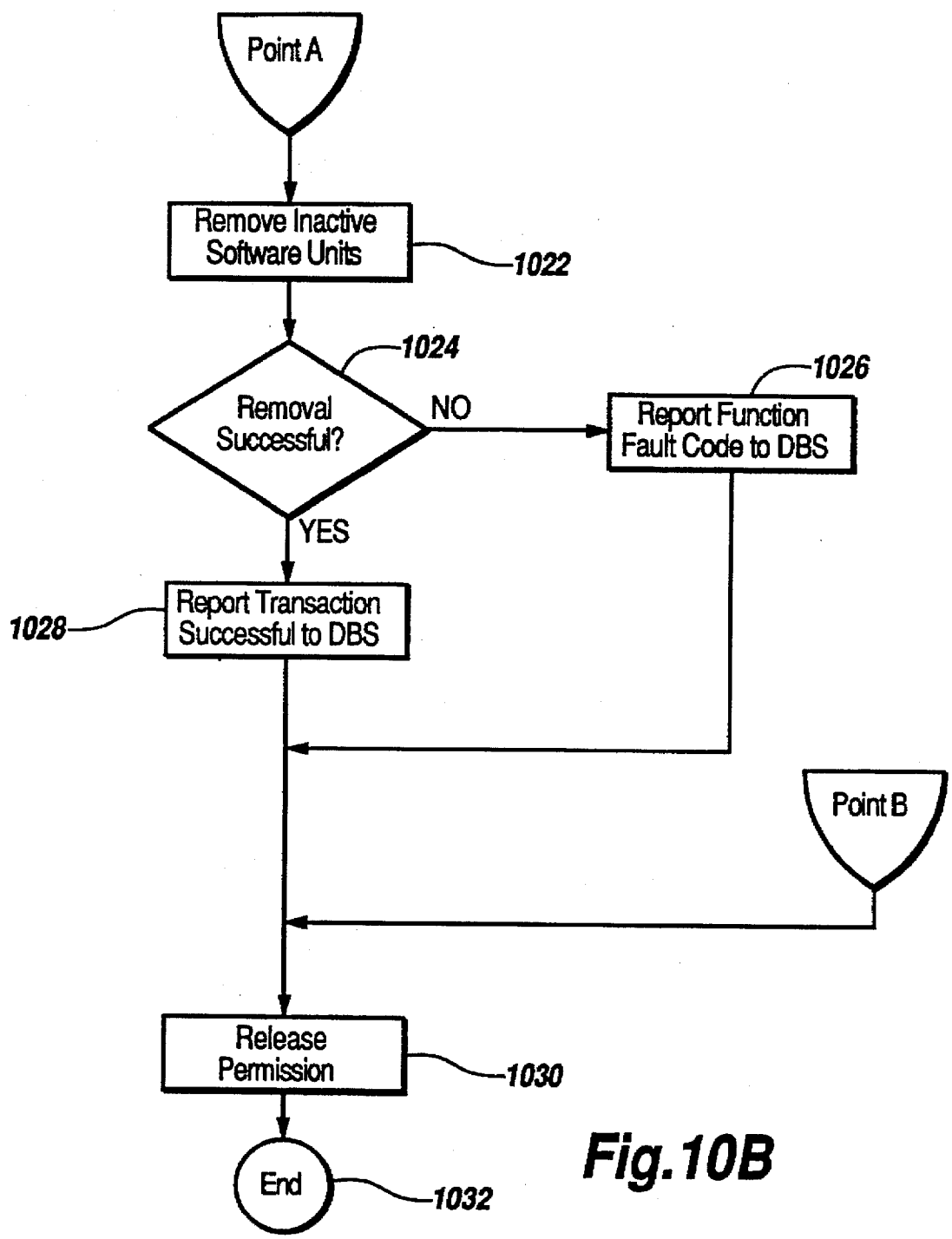

Referring now to FIGS. 10A–10B, a flow chart is shown which illustrates in greater detail the removal of the new software unit at step 416 in FIG. 4 according to a preferred embodiment of the present invention. The method of removing the new software unit begins at step 1000 and proceeds to step 1002. At step 1002, PXZA 320 sends a signal to LACO 310 (FIG. 3) requesting permission to update the system reference information. If LACO 310 grants permission, then the method proceeds to step 1006. If, however, LACO 310 refuses permission, then the method proceeds to step 1004 where a fault code is returned to the DBS 124 (FIG. 1), and the method proceeds to end at step 1032.

At step 1006, the PXPROGRAM table is accessed to select a new software unit specified for removal, and it is determined whether or not the program exchange state (PXSTATE) for the selected new software unit equals "INACTIVE". If it is determined that the PXSTATE for the selected new software unit equals "INACTIVE", then the method proceeds to step 1012. If, however, it is determined that the program exchange state for the selected new software unit is not equal to "INACTIVE", then the method proceeds to step 1008 where a fault code is returned to DBS 124 (FIG. 1). The method then proceeds to step 1012 where the selected new software unit is rolled back to its previous condition, and the method proceeds to step 1030 (FIG. 10B).

At step 1012 it is determined whether or not too large of a number of new software units are specified within the DBS command transaction for removal. If it is determined that too large of a number of new software units are specified for removal, then the method proceeds to step 1014. If, however, it is determined that an acceptable number of new software units are specified for removal, then the method proceeds to step 1018. At step 1014, a fault code is returned to DBS 124 (FIG. 1), and the method proceeds to step 1016 where the selected new software unit is rolled back to its previous condition, and the method proceeds to step 1030 (FIG. 10B). At step 1018, the block number for the selected new software unit is recorded from an associated row within the PXPROGRAM table, and the method proceeds to step 1020. At step 1020, it is determined whether or not other new software units specified for removal exist within the PXPROGRAM table. If it is determined that other specified new software units specified for removal exist within the PXPROGRAM table, then the method proceeds back to step 1006, and repeats the above enumerated steps for a different new software unit. If, however, it is determined that no other new software units specified for removal exist within the PXPROGRAM table, then the method proceeds to step 1022 (FIG. 10B).

Referring now to FIG. 10B, at step 1022, removal of the inactive software units (i.e. inactive new software units) is performed. The removal is implemented by PXZA 320 (FIG. 3) which sends the block names for the inactive software units to LACO 310. PXZA 320 also orders LACO 310 to remove the inactive software units which are loaded at the respective program exchange numbers. PXZA 320 then removes the program exchange information from the PXPROGRAM table for each inactive software unit that was successfully removed by LACO 310, and the method proceeds to step 1024.

At step 1024, it is determined whether or not all the specified removals were performed successfully. If it is determined that the specified removals were performed successfully, then the method proceeds to step 1028. If, however, it is determined that any of the specified removals was unsuccessful, then the method proceeds to step 1026. At step 1026, a fault code is reported to DBS 124 (FIG. 1), and the method proceeds to step 1030. At step 1028, an indication that the removal of the specified inactive software units was successful is reported to DBS 124, and the method proceeds to step 1030. At step 1030, permission for updating the system reference information is relinquished, and the method proceeds to end at step 1032.

The steps previously described above for removing the inactive software units are substantially identical for removing an old software unit at step 420 in FIG. 4, except for reversing the rules of each software unit as previously described.

PXZMD 314 is also capable of recovering a program exchange which is interrupted by a restart action within a switch. PXZMD 314 implements the recovery by obtaining permission to update the system reference information from LACO 310, and if necessary, recovering the reference information that was updated at the time of the restart. PXZMD 314 then switches the reference information for all unprocessed software units within the interrupted program exchange. PXZMD 314 also switches the PS 202 area (FIG. 2) CHECKSUM and variable symbol information for the selected new and old software units.

The extent of the modifications or corrections to new software units intended to be introduced by the program exchange method is restricted. The restrictions enable the new software unit to be exchanged with an old software unit without disturbing ongoing traffic within the switch 104, thereby eliminating the need for a system restart.

The restrictions of the new software unit include the following: the block properties must be the same as the old software unit, the signal interface must be the same as the old software unit's signal interface, no changes in the record structure of an existing non-size-alterable data file that contains any variables that are not STATIC-marked, and no changes of the initial size of a non-alterable data file that contains any variables that are not STATIC-marked. The restrictions also include no changes of any of the following attributes of a non-STATIC-marked variables: variable length, number of indexed variables, pointer indicator, number of subrecords, data file number, and buffer property.

Figure 11:
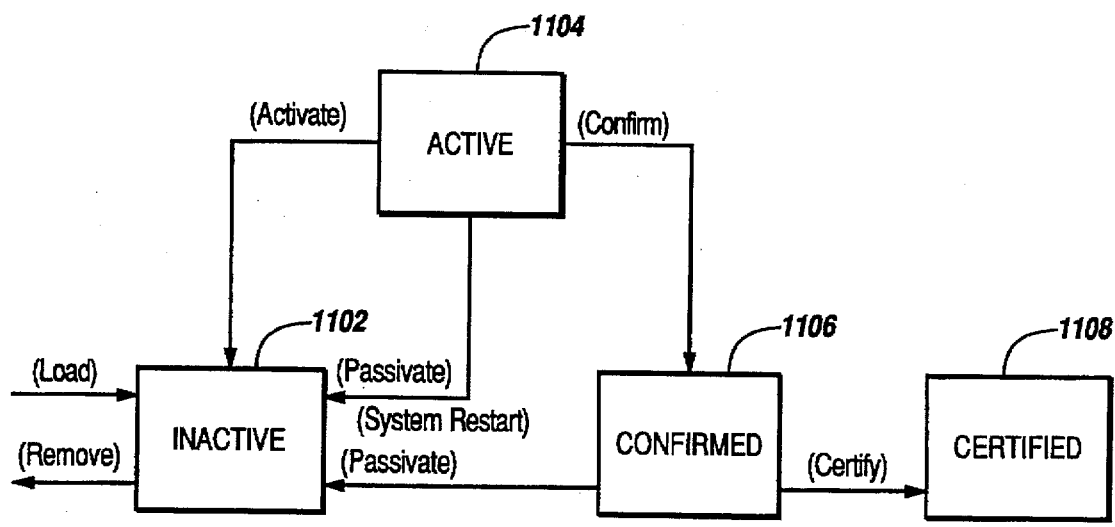
FIG. 11 is a block diagram which illustrates the various program exchange states of a new software unit as it progresses through the program exchange method of the present invention.

Referring now to FIG. 11, a block diagram is shown which illustrates the various program exchange states of a new software unit as it is exchanged with an old software unit according to the program exchange method of the present invention. When the new software unit is loaded into a switch it has a program exchange state of "INACTIVE" as indicated at 1102. During the execution of the new software unit, its program exchange state is changed by an operator to "ACTIVE" as indicated at 1104. Once the new software unit has been verified as operating properly, its program exchange state is changed by an operator to "CONFIRMED" as indicated at 1106. Finally, upon completion of exchanging the new software unit, the new software unit's program exchange state is changed by an operator to "CERTIFIED" as indicated at 1108.

DETAILED EXAMPLE

Figure 12:
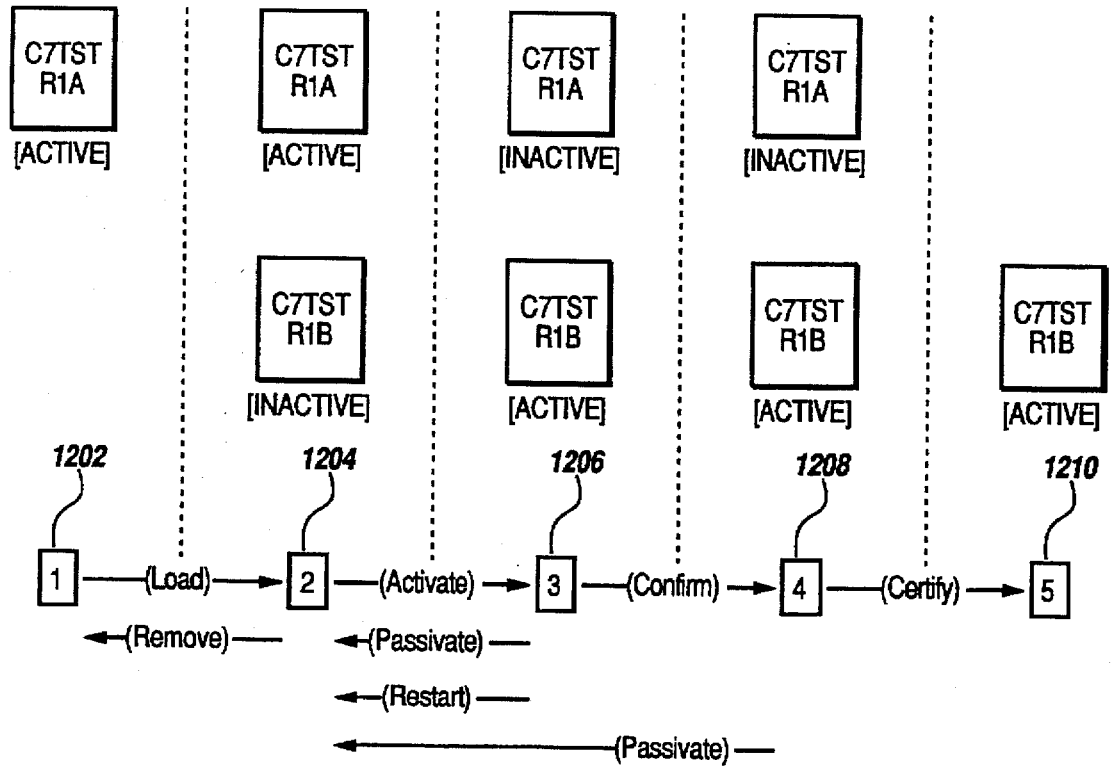
FIG. 12 is a block diagram illustrating an example of the various stages through which a new and old software unit progress during the program exchange method of the present invention.

Referring now to FIG. 12, a block diagram is shown which illustrates an example of the various stages that a new and an old software unit progress according to the program exchange method of the present invention. In the current example, the old software unit is addressed as C7TST and has a R-STATE of R1A, referred to hereinafter as C7TST R1A, and the new software unit is addressed as C7TST and has an R-STATE of R1B, referred to hereinafter as C7TST R1B. Each of the transitions illustrated in FIG. 12 for the old and the new software unit are performed by an operator using the DBS 124 (FIG. 1).

In the current example, the old software unit C7TST R1A is initially executing within a switch, and has a state of "ACTIVE" as illustrated at stage 1 1202. At stage 2 1204, the new software unit C7TST R1B is loaded and has a program exchange state of "INACTIVE". During this time period, the old software unit C7TST R1A is still being executed, and therefore, retains the state of "ACTIVE". At this stage of the program exchange, the new software unit may be removed from the switch by an operator, thereby, terminating the program exchange. At stage 3 1206, the new software unit is activated by an operator resulting in its program exchange state changing to "ACTIVE" and the old software unit's program exchange state changing to "INACTIVE". The above program exchange states for the old and new software units at stage 3 1206 would be reversed if the operator chose to passivate the new software unit, or if a system restart occurred during the program exchange.

At stage 4 1208, the operator uses DBS commands to change the program exchange state of the new software unit to "CONFIRM". At this stage of the program exchange, the operator may passivate the new software unit and activate the old software unit, resulting in proceeding back to stage 2 1204. At stage 5 1210, the old software unit C7TST R1A is removed from the switch.

It is thus believed that the operation and construction of the present invention will be apparent from the foregoing description. While the method shown and described has been characterized as being preferred, it will be readily apparent that various changes and modifications could be made therein without departing from the spirit and scope of the invention as defined in the following claims.

Patent Application
Docket #15735/0089

APPENDIX A

Logic Path 322 Signals (PX≠A ↔ LACO)

| SIGNAL | FUNCTION | FROM | TO |
| --- | --- | --- | --- |
| GETLODWRTKEY | Get the system information write key for the current loading operation. | PXZA | LACO |
| GETLODWRTKEYACK | Acknowledgement to GETLODWRTKEY. | LACO | PXZA |
| NAMPRG1 | Send name of block to be removed. | PXZA | LACO |
| NAMPRG1RPY | Reply to NAMPRG1. | LACO | PXZA |
| PXREGRESULT | Send result of registration of information about program loaded for program change. | PXZA | LACO |
| REMPRG1 | Order to start removing blocks. | PXZA | LACO |
| REMPRG1END | Reply to REMPRG1. | LACO | PXZA |
| SETBATSIZREQ | Request to set the size of the base address table for the given block number. | PXZA | LACO |
| SETBATSIZREQR | Reply to SETBATSIZREQ. | LACO | PXZA |
| WRTKEYREQ | Request for the system information write key. | PXZA | LACO |
| WRTKEYREQRPY | Reply to WRTKEYREQ. | LACO | PXZA |
| WRTKEYRET | Return the system information write key. | PXZA | LACO |
| WRTKEYRETRPY | Reply to WRTKETRET. | LACO | PXZA |

Logic Path 324 Signals (PX≠A ↔ PX≠D)

| SIGNAL | FUNCTION | FROM | TO |
| --- | --- | --- | --- |
| CHKVARDIFFS | Check for differences in the properties of the variables allocated for two versions of a central software unit. | PXZA | PXZD |
| CHKVARDIFFSR | Reply to CHKVARDIFFS. | PXZD | PXZA |
| REMREDLODINF | Remove the redundant loading information for a central software unit loaded for program change. | PXZA | PXZD |
| REMREDLODINFR | Reply to REMREDLODINF. | PXZD | PXZA |

Logic Path 326 signals (PXZA ↔ PXZS)

| SIGNAL | FUNCTION | FROM | TO |
|---|---|---|---|
| CHKSIGDIFFS | Check for differences in the signal interface for two versions of a central software unit. | PXZA | PXZS |
| CHKSIGDIFFSR | Reply to CHKSIGDIFFS. | PXZS | PXZA |

Logic Path 328 signals (PXZA ↔ PXZMD)

| SIGNAL | FUNCTION | FROM | TO |
|---|---|---|---|
| CHAPROGRAM | Change the two versions of the program for the central software units prepared for program change. | PXZA | PXZMD |
| CHAPROGRAMR | Reply to CHAPROGRAM. | PXZMD | PXZA |
| PREPAREPXINF | Prepare the information required to exchange two versions of the program for a central software unit. | PXZA | PXZMD |
| PREPAREPXINFR | Reply to PREPAREPXINF. | PXZMD | PXZA |

Logic Path 330 signals (PXZD ↔ LARI)

| SIGNAL | FUNCTION | FROM | TO |
|---|---|---|---|
| CALREFINF | Calculate and write the required reference information for an information type. | PXZD | LARI |
| CALREFINFACK | Acknowledgement to CALREFINF | LARI | PXZD |
| REDBATINF | Read the contents of the base address table for the given block number and base address number. | PXZD | LARI |
| REDBATINFACK | Acknowledgement to REDBATINF. | LARI | PXZD |
| REDREFINF | Read the reference table or base address table for the given block number and possible base address number. | PXZD | LARI |
| REDREFINFACK | Acknowledgement to REDREFINF. | LARI | PXZD |
| WRTABSADR | Write data at an absolute address in a CP store. | PXZD | LARI |
| WRTABSADRACK | Acknowledgement to WRTABSADR. | LARI | PXZD |

| SIGNAL | FUNCTION | FROM | TO |
|---|---|---|---|
| WRTBATINF | Update the entire position of the base address table for the given block number and base address number. | PXZD | LARI |
| WRTBATINFACK | Acknowledgement to WRTBATINF. | LARI | PXZD |

Logic Path 332 Signals (PXZS ↔ LARI)

| SIGNAL | FUNCTION | FROM | TO |
|---|---|---|---|
| REDREFINF | Read the reference table or base address table for the given block number and possible base address number. | PXZS | LARI |
| REDREFINFACK | Acknowledgement to REDREFINF. | LARI | PXZS |
| REDSIGINF | Read the specified position in the SDT or SST for the given block number. | PXZS | LARI |
| REDSIGINFACK | Acknowledgement to REDSIGINF. | LARI | PXZS |

Logic Path 334 Signals (PXZD ↔ LACO)

| SIGNAL | FUNCTION | FROM | TO |
|---|---|---|---|
| REMVARREQ | Request the removal of the allocation information for the variable specified by the given block number and base address number. | PXZD | LACO |
| REMVARREQR | Reply to REMVARREQ. | LACO | PXZD |
| SETBATSIZREQ | Request to set the size of the base address table for the given block number. | PXZD | LACO |
| SETBATSIZREQR | Reply to SETBATSIZREQ. | LACO | PXZD |

Logic Path 338 Signals (PXZMD ↔ LACO)

| SIGNAL | FUNCTION | FROM | TO |
|---|---|---|---|
| WRTKEYREQ | Request for the system information write key. | PXZMD | LACO |
| WRTKEYREQRPY | Reply to WRTKEYREQ. | LACO | PXZMD |
| WRTKEYRET | Return the system information write key. | PXZMD | LACO |
| WRTKEYRETRPY | Reply to WRTKETRET. | LACO | PXZMD |

Logic Path 340 Signals (PXZMD ↔ LASYMD)

| SIGNAL | FUNCTION | FROM | TO |
|---|---|---|---|
| SWITCHSYMB | Switch the symbol information for the two given block numbers. | PXZMD | LASYMB |
| SWITCHSYMBR | Reply to SWITCHSYMBR. | LASYMB | PXZMD |

Logic Path 342 Signals (PXZMD ↔ AFCO)

| SIGNAL | FUNCTION | FROM | TO |
|---|---|---|---|
| PSCSCHANGE | Change the program store checksums for the given pairs of block numbers. | PXZMD | AFCO |
| PSCSCHANGER | Reply to PSCSCHANGE. | AFCO | PXZMD |

Logic Path 344 Signals (PXZMD ↔ TEM)

| SIGNAL | FUNCTION | FROM | TO |
|---|---|---|---|
| REMTRABLK | Remove the trace measures for the given block number. | PXZMD | TEM |
| REMTRABLKRPY | Reply to REMTRABLK. | TEM | PXZMD |

Logic Path 346 Signals (PXZA ↔ LARI)

| SIGNAL | FUNCTION | FROM | TO |
|---|---|---|---|
| BSFORNO | Get the block state for the given block number. | PXZA | LARI |
| BSFORNOACK | Acknowledgement to BSFORNO. | LARI | PXZA |
| REDREFINF | Read the reference table or base address table for the given block number and possible base address number. | PXZA | LARI |
| REDREFINFACK | Acknowledgement to REDREFINF. | LARI | PXZA |

Logic Path 348 Signals (PXZA ↔ KEED)

| SIGNAL | FUNCTION | FROM | TO |
|---|---|---|---|
| EVENTMESSAGEC | Message about a system event. | KEED | PXZA |
| EVENTMSGREQ | Request to be informed when a system event has occured. | PXZA | KEED |
| EVENTMSGREQACK | Acknowledgement to EVENTMSGREQACK. | KEED | PXZA |

What is claimed is:

1. A method of exchanging within a computer system an old software version for a new software version without a restart, the old software version having old block properties including types, an old signal interface, and an old variable structure for accessing data, and the new software version having new block properties including types, a new signal interface, and a new variable structure for accessing the same data, said method comprising the steps of:

loading said new software version into said computer system;

registering said new software version by determining that the old and new block types are the same, that the old and new signal interfaces are compatible, and that the old and new variable structures are compatible;

passivating said old software version following new software version registration; and activating said registered new software version at the time of old software version passivation, and without performing a conversion of the data from old to new.

2. The method of claim 1 further including the step of confirming said activated new software version.

3. The method of claim 2 further including the step of certifying said confirmed new software version.

4. The method of claim 2 wherein said certifying step includes the step of removing said passivated old software version from said computer system.

5. A method of exchanging within a computer system an old software version for a new software version without a restart, the old software version having old block properties including types, an old signal interface, and an old variable structure for accessing data, and the new software version having new block properties including types, a new signal interface, and a new variable structure for accessing the same data, said method including the steps of:

loading said new software version into said computer system;

registering said new software version by determining that the old and new block types are the same, that the old and new signal interfaces are compatible, and that the old and new variable structures are compatible;

activating said registered new software version without performing a conversion of the data from old to new;

passivating said old software version at the time of new software version activation;

confirming said activated new software version; and certifying said confirmed new software version.

6. The method of claim 5 further including the step of moving said passivated old software version from said computer system.

7. An apparatus for exchanging within a computer system an old software version for a new software version without a restart, the old software version having old block properties including types, an old signal interface, and an old variable structure for accessing data, and the new software version having new block properties including types, a new signal interface, and a new variable structure for accessing the same data, said apparatus comprising:

means for loading said new software version into said computer system;

means for registering said new software version by determining that the old and new block types are the same, that the old and new signal interfaces are compatible, and that the old and new variable structures are compatible;

means for passivating said old software version following new software version registration; and means for activating said registered new software version at the time of old software version passivation, and without performing a conversion of the data from old to new.

8. The apparatus of claim 7 further including means for confirming said activated new software version.

9. The apparatus of claim 8 further including means for certifying said confirmed new software version.

10. The apparatus of claim 8 wherein said means for certifying includes means for removing said passivated old software version from said computer system.

11. An apparatus for exchanging within a computer system an old software version for a new software version without a restart, the old software version having old block properties including types, an old signal interface, and an old variable structure for accessing data, and the new software version having new block properties including types, a new signal interface, and a new variable structure for accessing the same data, said apparatus comprising:

means for loading said new software version into said computer system;

means for registering said new software version by determining that the old and new block types are the same, that the old and new signal interfaces are compatible, and that the old and new variable structures are compatible;

means for activating said registered new software version without performing a conversion of the data from old to new;

means for passivating said old software version at the time of new software version activation;

means for confirming said activated new software version; and means for certifying said confirmed new software version.

12. The system of claim 11 further including means for removing said passivated old software version from said computer system.

* * * * *

UNITED STATES PATENT AND TRADEMARK OFFICE
CERTIFICATE OF CORRECTION

PATENT NO. : 5,682,533
DATED : Oct. 28, 1997
INVENTOR(S) : Siljestroemer

It is certified that error appears in the above-identified patent and that said Letters Patent is hereby corrected as shown below:

Column 1, line 31        Replace "version,"
                         With --version.--

Column 5, line 26        Replace "hi-directional"
                         With --bi-directional--

Column 10, line 61       Replace "DB$"
                         With --DBS--

Column 16, line 9        Replace "RIB"
                         With --R1B--

Column 16, line 10       Replace "RIB"
                         With --R1B--

Column 16, line 16       Replace "RIB"
                         With --R1B--

Signed and Sealed this

Second Day of June, 1998

*Attest:*

BRUCE LEHMAN

*Attesting Officer*        *Commissioner of Patents and Trademarks*